US008979974B2

(12) United States Patent
Nomura et al.

(10) Patent No.: US 8,979,974 B2
(45) Date of Patent: *Mar. 17, 2015

(54) COMPOSITION FOR COLLECTING METAL COMPONENT

(71) Applicant: National Institute of Advanced Industrial Science and Technology, Tokyo (JP)

(72) Inventors: Katsuhiro Nomura, Ikeda (JP); Hiroyuki Kageyama, Osaka (JP); Masakazu Date, Tsukuba (JP); Tadahiro Fujitani, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/923,740

(22) Filed: Jun. 21, 2013

(65) Prior Publication Data

US 2013/0283978 A1    Oct. 31, 2013

Related U.S. Application Data

(62) Division of application No. 13/122,865, filed as application No. PCT/JP2009/064819 on Aug. 26, 2009, now abandoned.

(30) Foreign Application Priority Data

Oct. 9, 2008  (JP) ................................. 2008-263191

(51) Int. Cl.
| | | |
|---|---|---|
| *C22B 7/00* | (2006.01) | |
| *C22B 1/00* | (2006.01) | |
| *C22B 11/00* | (2006.01) | |
| *C22B 34/34* | (2006.01) | |
| *C22B 59/00* | (2006.01) | |
| *C22C 16/00* | (2006.01) | |
| *C22C 28/00* | (2006.01) | |
| *C22B 3/00* | (2006.01) | |
| *C22B 34/36* | (2006.01) | |
| *C22B 3/24* | (2006.01) | |
| *C22B 7/02* | (2006.01) | |

(52) U.S. Cl.
CPC ................. *C22B 1/005* (2013.01); *C22B 7/007* (2013.01); *C22B 7/009* (2013.01); *C22B 11/042* (2013.01); *C22B 11/048* (2013.01); *C22B 34/34* (2013.01); *C22B 34/36* (2013.01); *C22B 59/00* (2013.01); *C22C 16/00* (2013.01); *C22C 28/00* (2013.01); *C22B 3/24* (2013.01); *C22B 7/02* (2013.01)

USPC ............... 75/364; 75/392; 75/401; 423/593.1

(58) Field of Classification Search
CPC ...... C22B 7/007; C22B 7/009; C22B 11/042; C22B 11/048; C22B 1/005; C22B 34/34; C22B 34/36; C22B 59/00; C22C 16/00; C22C 28/00

USPC ........ 75/364, 392, 401; 432/593.1; 423/593.1
See application file for complete search history.

(56) References Cited

U.S. PATENT DOCUMENTS

| | | | |
|---|---|---|---|
| 3,645,719 A | 2/1972 | Minnick | |
| 4,077,800 A | 3/1978 | Peka et al. | |
| 4,361,442 A | 11/1982 | Faulring et al. | |
| 4,384,885 A | 5/1983 | Muller et al. | |
| 6,352,955 B1 | 3/2002 | Golden | |
| 6,497,851 B1 | 12/2002 | Hu et al. | |
| 6,905,989 B2 | 6/2005 | Ellis et al. | |
| 7,157,405 B2 | 1/2007 | Suzuki et al. | |
| 8,048,194 B2 | 11/2011 | Rathweg | |
| 8,623,113 B2 * | 1/2014 | Nomura et al. | ................. 75/401 |
| 2001/0010181 A1 | 8/2001 | Zasowski et al. | |
| 2009/0253574 A1 | 10/2009 | Tanaka et al. | |
| 2010/0080744 A1 | 4/2010 | Schmidt et al. | |

(Continued)

FOREIGN PATENT DOCUMENTS

| | | | |
|---|---|---|---|
| JP | 52-113322 A | 9/1977 | |
| JP | 4-354831 A | 12/1992 | |

(Continued)

OTHER PUBLICATIONS

Kikuo Fujiwara; "Recycling of Precious Metals Catalyst"; Chemical Engineering, vol. 55, No. 1, pp. 21-24, 1991, The Society of Chemical Engineers, Japan( with English Translation Thereof).

(Continued)

*Primary Examiner* — George Wyszomierski
*Assistant Examiner* — Tima M McGuthry Banks
(74) *Attorney, Agent, or Firm* — Westerman, Hattori, Daniels & Adrian, LLP

(57) ABSTRACT

The present invention provides a composition for collecting a metal component from a metal component-containing material, the composition containing a compound containing at least one element selected from the group consisting of lanthanoid elements and elements in group 2 of the periodic table, and a compound containing at least one element selected from the group consisting of elements in groups 3, 4, 12, and 13 of the periodic table and transition metal elements in the 4th period of the periodic table. The present invention further provides a method for collecting a metal component using this composition. With the use of the composition of the present invention, a metal component can be easily and efficiently collected from a material containing a highly useful metal component such as noble or rare metal.

5 Claims, 13 Drawing Sheets

(56) References Cited

U.S. PATENT DOCUMENTS

2011/0017022 A1 1/2011 Date et al.
2011/0192255 A1 8/2011 Nomura et al.

FOREIGN PATENT DOCUMENTS

| JP | 06-025758 A | 2/1994 |
| JP | 2005-257175 A | 9/2005 |
| JP | 2007-51035 A | 3/2007 |
| JP | 2008-1916 A | 1/2008 |
| JP | 2008-100902 A | 5/2008 |
| WO | 2007/138807 A1 | 12/2007 |

OTHER PUBLICATIONS

US Final Office Action dated Apr. 29, 2013, issued in U.S. Appl. No. 12/919,724.
US Office Action dated Mar. 27, 2013, issued in U.S. Appl. No. 13/074,341.
US Non-Final Office Action dated Dec. 12, 2012, issued in U.S. Appl. No. 12/919,724.
Date et al., "Unique Catalytic Activity of Platinum Eluted into Perovskite in the Solid Phase", Catalysios Letters, Sep. 2007, vol. 117, Nos. 3-4, pp. 107-111.
International Search Report for PCT/JP2009/053388 mailed Mar. 31, 2009 (with English translation).
Nomura et al., Ultramarine colored: Solid-phase elution of Pt into perovskite oxides:, Journal of Materials Research, Oct. 2007, vol. 22, No. 10, pp. 2647-2650.
International Search Report of PCT/JP2009/064819, mailing date Dec. 1, 2009.
Kikuo Fujiwara; "Recycling of Precious Metals Catalyst"; Chemical Engineering, vol. 55, No. 1, pp. 21-24, 1991, The Society of Chemical Engineers, Japan.; with Partial English translation.

* cited by examiner

COMPOSITION FOR COLLECTING METAL COMPONENT

CROSS-REFERENCE TO RELATED APPLICATIONS

This application is a divisional of U.S. application Ser. No. 13/122,865 filed on Apr. 6, 2011, now abandoned, which is a 371 of PCT/JP2009064819 filed Aug. 26, 2009, the entire contents of which is incorporated herein by reference.

TECHNICAL FIELD

The present invention relates to a composition for collecting a metal component from a metal component-containing material, and a method for collecting a metal component using the composition.

BACKGROUND ART

Noble metals and rare metals are widely used for industrial purposes for their excellent stability, catalyst activity, etc. However, because noble metals and rare metals are rare and expensive resources, effective utilization thereof is necessary. Therefore, it is important to efficiently collect and reuse noble or rare metal contained in used noble or rare metal-containing waste materials, such as waste catalysts for purifying automobile exhaust gas, waste catalysts for chemical industries, wastes generated in electronic circuit board manufacturing processes, waste electronic components, wastes of electrolysis electrode, and the like.

Typical examples of methods for collecting noble or rare metal include a wet method, such as a dissolution method comprising dissolving a metal component in a strong acid to thereby collect metal; and a dry method comprising collecting metal by absorption of a metal component into molten metal (see Non-Patent Literature (NPL) 1). However, various waste materials, such as electronic components, battery cells, catalysts, cellular phones, and automobile parts, contain noble or rare metal etc. Therefore, whichever method, i.e., wet or dry method, is employed for the collection, formation of processes or systems suitable for the properties of each of the materials is needed.

In a wet method, acids destroy the material itself of a waste material. Therefore, even if noble metal etc. is collected, the base material thereof cannot be reused. In addition, after-treatment of the dissolved residue is troublesome. Further, in a wet method, the dissolution rate of noble or rare metal by acid is low, and a waste material containing a smaller amount of noble or rare metal requires a relatively larger amount of acid. Furthermore, because strong acids must be handled with care and may cause adverse environmental effects, an increase in equipment investment is unavoidable.

With respect to the dry method, which uses a molten metal, such as iron, copper, lead, or the like, as a material for absorbing noble or rare metal, the efficiency of noble or rare metal absorption is not so high, the devices are costly because the method is performed at a high temperature, and thus expensive equipment is required. Further, at present, using molten lead is substantially difficult because it is environmentally harmful.

CITATION LIST

Non-Patent Literature

NPL 1: Kikuo FUJIWARA, "Recycling of Precious Metals Catalyst", Chemical Engineering, Volume 55, No. 1, p. 21, 1991, The Society of Chemical Engineers, Japan

SUMMARY OF INVENTION

Technical Problem

The present invention was made in view of the above-described drawbacks in the prior art. A principal object of the present invention is to provide a method for easily and efficiently collecting a metal component from a material containing a highly useful metal component such as noble or rare metal. Another object of the present invention is to provide a treatment agent usable in this method.

Solution to Problem

The present inventors conducted extensive research to achieve the above-described objects, and found the following. When a composition comprising a compound containing at least one element selected from the group consisting of lanthanoid elements and elements in group 2 of the periodic table, and a compound containing at least one element selected from the group consisting of elements in groups 3, 4, 12, and 13 of the periodic table and transition metal elements in the 4th period of the periodic table, is placed in a container together with a target metal component-containing material to be treated, and heated, the components of the aforementioned composition cause the formation of a reaction product comprising a complex oxide having a perovskite-type crystal structure, allowing the metal component vaporized from the target material to be occluded in the reaction product. The present inventors found that this method can efficiently collect a metal component from a waste material containing a noble or rare metal component etc. Thereby, the present invention was completed.

More specifically, the present invention provides the following composition for collecting a metal component, method for collecting a metal component, and method for recovering a solid metal.

1. A composition for collecting one or more metal components from a metal component-containing material, the composition comprising a compound containing at least one element selected from the group consisting of lanthanoid elements and elements in group 2 of the periodic table, and a compound containing at least one element selected from the group consisting of elements in groups 3, 4, 12, and 13 of the periodic table and transition metal elements in the 4th period of the periodic table.

2. The composition according to Item 1, wherein the amount of the at least one element selected from the group consisting of elements in groups 3, 4, 12, and 13 of the periodic table and transition metal elements in the 4th period of the periodic table is 0.8 to 1.2 mol, per 1 mol of the at least one element selected from the group consisting of lanthanoid elements and elements in group 2 of the periodic table.

3. A method for collecting one or more metal components from a metal component-containing material, the method comprising heating the metal component-containing material and the composition of Item 1 or 2, in such a manner that a metal vapor or metal oxide vapor produced by heating the metal component-containing material is brought into contact with the composition.

4. The method according to Item 3, wherein the metal component-containing material and the composition of Item 1 or 2 are placed together in one container and heated.

5. The method according to Item 3 or 4, wherein the metal component-containing material is a noble or rare metal component-containing waste material.

6. A method for recovering metal, comprising: collecting one or more metal components by the method of any of Items 3 to 5;

dissolving the collected one or more metal elements in an acid; and then recovering the dissolved one or more metal elements as a solid metal.

Hereinafter, specific descriptions are given with respect to the composition of the present invention; the target to be treated in collecting a metal component using the composition; the method for collecting a metal component using the composition; and the method for dissolving and recovering a metal element that is occluded in the composition.

Composition of the Present Invention

The composition of the present invention comprises a compound (hereinafter sometimes referred to as a "site A compound") containing at least one element selected from the group consisting of lanthanoid elements and elements in group 2 of the periodic table, and a compound (hereinafter sometimes referred to as a "site B compound") containing at least one element selected from the group consisting of elements in groups 3, 4, 12, and 13 of the periodic table and transition metal elements in the 4th period of the periodic table.

By heating a metal component-containing material with the aforementioned composition, a reaction product containing a complex oxide having a perovskite-type crystal structure is formed from the site A compound and the site B compound, which are contained in the composition, and a metal component vaporized from the metal component-containing material is occluded in the reaction product. This method enables efficient collection of noble or rare metal etc., from, for example, waste materials containing noble or rare metal components etc.

Examples of lanthanoid elements contained in the site A compound of the composition of the present invention include La, Ce, Pr, Nd, Gd, and the like; and examples of elements in group 2 of the periodic table include Ca, Sr, Ba, and the like.

The site A compound, i.e., a compound containing at least one element selected from the group consisting of lanthanoid elements and elements in group 2 of the periodic table, may contain only one element selected from lanthanoid elements and elements in group 2 of the periodic table; or simultaneously contain two or more elements selected therefrom. The type of the site A compound is not limited, as long as the compound can form an oxide under the heat conditions mentioned below. As such a compound, for example, oxides, hydroxides, carbonates, nitrates, sulfates, chlorides, and like inorganic compounds; alkoxide compounds, and like organic compounds; etc. can be used. The site A compound may be used singly, or in a combination of two or more.

Examples of elements in group 3 of the periodic table contained in the site B compound include Sc, Y, and the like; examples of elements in group 4 of the periodic table include Ti, Zr, Hf, and the like; examples of elements in group 12 of the periodic table include Zn and the like; examples of elements in group 13 of the periodic table include Al, Ga, In, and the like; and examples of transition metal elements in the 4th period of the periodic table include Cr, Mn, Fe, Co, Ni, Cu, and the like.

The site B compound, i.e., a compound containing at least one element selected from the group consisting of elements in groups 3, 4, 12, and 13 of the periodic table and transition metal elements in the 4th period of the periodic table, may contain one element selected from elements in groups 3, 4, 12, and 13 of the periodic table and transition metal elements in the 4th period of the periodic table; or simultaneously contain two or more elements selected therefrom. The types of the site B compound are also not limited, as long as the compound can form an oxide under the heat treatment conditions mentioned below. As such a compound, for example, oxides, hydroxides, carbonates, nitrates, sulfates, chlorides, and like inorganic compounds; alkoxide compounds, and like organic compounds; etc. can be used. The site B compound may be used singly, or in a combination of two or more.

The site A compound and the site B compound may be used in a ratio such that the total amount of elements in groups 3, 4, 12, and 13 of the periodic table and transition metal elements in the 4th period of the periodic table, contained in the site B compound, is within the range of about 0.8 to about 1.2 mol, preferably within the range of about 0.9 to 1.1 mol, per 1 mol of the total amount of lanthanoid elements and elements in group 2 of the periodic table, contained in the site A compound.

The composition of the present invention may comprise other compounds, in addition to the site A compound and the site B compound, as long as the other compounds do not have an adverse effect on the reaction product formed from the composition of the present invention, in terms of its properties, e.g., a metal component-collection performance. Examples of the aforementioned other compounds include compounds containing alkali metal (Li, Na, K, etc.); compounds containing silicon; compounds containing phosphorus; compounds containing sulfur; and the like. The amount of the metal elements contained in the compounds other than the site A compound and the site B compound is preferably about 0.05 mol or less, more preferably about 0.03 mol or less, when the total amount of the metal elements contained in the site A compound and the site B compound is 1 mol. The metal elements contained in the compound other than the site A compound and the site B compound may be included in a site A or B of a perovskite-type complex oxide formed from the composition of the present invention, or in reaction product other than the perovskite-type complex oxide, depending on the combination of the starting materials.

The complex oxide having a perovskite-type crystal structure preferably has an oxygen defect in its crystal structure. A complex oxide having an oxygen defect may be formed by, for example, using the starting materials in combination in such a manner that two or more elements of different valence are contained in the materials, as at least one of the site A compound or the site B compound.

As one embodiment in which the starting materials as the site A compound are used in such a manner that two or more elements of different valence are contained in the materials, the starting materials may be selected so that a lanthanoid element having a valence of +3 (La, Nd, etc.) is contained in a proportion of 0.5 to 0.9 mol; and an element in group 2 of the periodic table having a valence of +2 (Ba, Sr, etc.) is contained in a proportion of 0.5 to 0.1 mol, when the total amount of the metal elements contained in the site A compound is 1 mol. It is preferable that a lanthanoid element having a valence of +3 (La, Nd, etc.) is contained in a proportion of 0.7 to 0.8 mol, and an element in group 2 of the periodic table having a valence of +2 (Ba, Sr, etc.) is contained in a proportion of 0.3 to 0.2 mol. Based on the above-described combination of elements in the site A compound, the starting material(s) as the site B compound may be selected from those containing 0.8 to 1.2 mol of at least one element having a valence of +3 and selected from the group consisting of elements in group 3 of the periodic table (Sc, Y, etc.); elements in group 13 of the periodic table (Al, Ga, In, etc.); and transition metal elements in the 4th period of the periodic table (Cr, Mn, Fe, Co, Ni, Cu, etc.).

As one embodiment in which the starting materials as the site B compound are used in such a manner that two or more elements of different valence are contained in the materials, the starting materials may be selected so that an element in group 4 of the periodic table having a valence of +4 (Ti, Zr, Hf, etc.) is contained in a proportion of 0.5 to 0.9 mol; and at least one element having a valence of +3 and selected from the group consisting of elements in group 3 of the periodic table (Sc, Y, etc.), elements in group 13 of the periodic table (Al, Ga, In, etc.), and transition metal elements in the 4th period of the periodic table (Cr, Mn, Fe, Co, Ni, Cu, etc.) is contained in a proportion of 0.5 to 0.1 mol, when the total amount of the metal elements contained in the site B compound is 1 mol. It is preferable that an element in group 4 of the periodic table having a valence of +4 (Ti, Zr, Hf, etc.) is contained in a proportion of 0.7 to 0.8 mol; and at least one element having a valence of +3 and selected from the group consisting of elements in group 3 of the periodic table (Sc, Y, etc.), elements in group 13 of the periodic table (Al, Ga, In, etc.), and transition metal elements in the 4th period of the periodic table (Cr, Mn, Fe, Co, Ni, Cu, etc.) is contained in a proportion of 0.3 to 0.2 mol. Based on the above, the starting material(s) as the site A compound may be selected from compounds containing an element in group 2 of the periodic table having a valence of +2 (Ba, Sr, etc.), so that the total amount of the metal elements contained in the above-mentioned site B compound is in the range of from 0.8 to 1.2 mol, per 1 mol of the metal element of the site A compound.

As another embodiment in which the starting materials as the site B compound are used in such a manner that two or more elements of different valence are contained in the materials, the starting materials may be selected so that at least one element having a valence of +3 and selected from the group consisting of elements in group 3 of the periodic table (Sc, Y, etc.), elements in group 13 of the periodic table (Al, Ga, In, etc.), and transition metal elements in the 4th period of the periodic table (Cr, Mn, Fe, Co, Ni, Cu, etc.) is contained in a proportion of 0.5 to 0.9 mol; and an element in group 12 of the periodic table having a valence of +2 (Zn, etc.) is contained in a proportion of 0.5 to 0.1 mol, when the total amount of the metal elements contained in the site B compound is 1 mol. It is preferable that an element having a valence of +3 is contained in a proportion of 0.7 to 0.8 mol, and an element having a valence of +2 is contained in a proportion of 0.3 to 0.2 mol. Based on the above, the starting material(s) as the site A compound may be selected from those containing 0.8 to 1.2 mol of at least one element selected from lanthanoid elements having a valence of +3 (La, Nd, etc.).

As one embodiment in which, as each of the site A compound and the site B compound, the starting materials are used in such a manner that two or more elements of different valence are contained in the materials, the starting materials as the site A compound may be selected so that a lanthanoid element having a valence of +3 (La, Nd, etc.) is contained in a proportion of 0.5 to 0.9 mol, and an element in group 2 of the periodic table having a valence of +2 (Ba, Sr, etc.) is contained in a proportion of 0.5 to 0.1 mol, when the total amount of the metal elements contained in the site A compound is 1 mol. It is preferable that a lanthanoid element having a valence of +3 (La, Nd, etc.) is contained in a proportion of 0.7 to 0.8 mol; and an element in group 2 of the periodic table having a valence of +2 (Ba, Sr, etc.) is contained in a proportion of 0.3 to 0.2 mol. The starting materials as the site B compound may be selected so that at least one element having a valence of +3 and selected from the group consisting of elements in group 3 of the periodic table (Sc, Y, etc.), elements in group 13 of the periodic table (Al, Ga, In, etc.), and transition metal elements in the 4th period of the periodic table (Cr, Mn, Fe, Co, Ni, Cu, etc.) is contained in a proportion of 0.5 to 0.9 mol; and an element in group 12 of the periodic table having a valence of +2 (Zn, etc.) is contained in a proportion of 0.5 to 0.1 mol, when the total amount of the metal elements contained in the site B compound is 1 mol. It is preferable that the element having a valence of +3 is contained in a proportion of 0.7 to 0.8 mol, and the element having a valence of +2 is contained in a proportion of 0.3 to 0.2 mol, as the site B compound. In such a combination of the site A compound and the site B compound, the starting materials for these compounds may be selected so that the amount of the site B compound is within the range of from 0.8 to 1.2 mol, per 1 mol of the site A compound.

Further, according to the composition of the present invention, with respect to the complex oxide having a perovskite-type crystal structure formed from the site A compound and the site B compound, which are contained in the composition, the tolerance factor (t) defined by the formula:

$$t=(r_A+r_o)/(2^{1/2}\cdot(r_B+r_o)),$$

is preferably within the range of from 0.75 to 1.15, and more preferably within the range of from 0.9 to 1.1. In the above definitional formula of the tolerance factor, $r_A$ is an arithmetic average of the ionic radii of a cation of the site A compound, i.e., a lanthanoid element and an element in group 2 of the periodic table, contained in the composition of the present invention; $r_B$ is an arithmetic average of the ionic radii of a cation of the site B compound, i.e., an element in groups 3, 4, 12, and 13 of the periodic table and a transition metal element in the 4th period of the periodic table, contained in the composition of the present invention; and $r_o$ is the ionic radius of oxide ion ($O^{2-}$), which is 1.40 Å.

The tolerance factor (t) defined by the above formula indicates the degree of deformation with respect to the crystal structure of the perovskite-type complex oxide formed from the composition of the present invention. A tolerance factor of 1 is assumed to represent an ideal perovskite-type structure (cubic system). A tolerance factor of greater than 1 refers to an overly large A-site cation, relative to the size of the B-site cation, indicating that the perovskite-type structure is deformed. In contrast, a tolerance factor of smaller than 1 refers to an overly large B-site cation, relative to the size of the A-site cation, also indicating that the perovskite-type structure is deformed.

The tolerance factor may be calculated in accordance with the definitional formula above using the ionic radius of each ion; based on, for example, literature (R. D. Shannon, Acta Cryst., A32, and 751 (1976)) that discloses the size of ionic radius.

In the present invention, the tolerance factor (t) of the complex oxide formed from the composition of the present invention is preferably within the range of from 0.75 to 1.15, more preferably within the range of from 0.9 to 1.1. In this case, due to the formation of a reaction product containing a perovskite-type complex oxide having a relatively stable crystal structure, the metal component vaporized from the target material can be stably occluded in the reaction product.

Although there is no particular limitation to the forms of the site A compound and the site B compound contained in the composition of the present invention, it is preferable that the site A compound and the site B compound be treated in a ball mill or the like, to be formed into as fine a powder as possible, so that the site A compound and the site B compound readily undergo reaction to form a reaction product containing a perovskite-type complex oxide during the heat treatment under the conditions mentioned below. The fine powder preferably has an average particle diameter of, for example, about 100 μm or less. The compounds in powder form may also be formed into pellets. In this specification, an average particle diameter is a value calculated by a laser diffraction method.

Target to be Treated

In the method for collecting metal using the composition of the present invention, a target to be treated is a material that contains a target metal component to be collected (hereinafter sometimes simply referred to as a "metal-containing material"). Specifically, the metal-containing material may comprise a substance containing the target metal component (noble or rare metal component) to be collected; and a substance other than the above, such as metals, oxides, nitrides, carbon materials, ceramics, organic substances, and the like. When a treatment is performed in accordance with the method mentioned below using the composition of the present invention, the target metal component (noble or rare metal component) can be selectively collected from various materials comprising a substance containing the target metal component, and a substance other than the substance containing the target metal component. There is no limitation to the types of the target metal component to be collected, as long as it is vaporized and exists as vapor of the metal itself, or vapor of the oxide of the metal, under the treatment conditions described below.

There is also no particular limitation to the forms and shapes of the target metal-containing material to be treated. The target metal-containing material to be treated may be, for example, in powder, mesh, wire, foil, honeycomb, or in other arbitrary form. In addition, there is no particular limitation to the state of the existence of the target metal component contained in the target metal-containing material to be treated. For example, in the target metal-containing material, the substance containing the target metal component to be collected may be in the state of a metal such as a metal elementary substance or alloy, or in the state of a compound such as an oxide etc. that contains the metal. For example, metal components in various states, such as metal or metal oxide supported on a material such as an oxide; a metal film or a metal oxide film; and the like, can be collected. The metal-containing material may contain two or more target metal components to be collected.

The method of the present invention is particularly useful as a method for effectively collecting noble or rare metal component from waste materials containing noble or rare metal components as the target metal component to be collected. Examples of such waste materials include waste catalysts for purifying automobile exhaust gas, waste catalysts for chemical industries, waste gas sensor boards, wastes generated in electronic circuit board manufacturing processes, waste electronic components, wastes of electrolysis electrode, wastes generated from medical products such as dental products, and the like. In this case, the use of the composition of the present invention enables efficient collection of noble or rare metal components not only from materials containing a large amount of noble or rare metal components, but also from materials containing only a few ppm of noble or rare metal components. Examples of the target noble metal elements and rare metal elements to be collected include metal elements in groups 6, 7, 8, 9, 10, 11, etc. of the periodic table. Of the metal elements in these groups, the metal elements, for example, in the 5th or 6th period of the periodic table can be efficiently collected. Examples of such noble metal elements and rare metal elements include Pd, Pt, Rh, Ru, Ir, Re, Mo, W, Au, and the like.

Method for Collecting Metal Component

In the method of the present invention for collecting a metal component, a target metal-containing material to be treated and a composition of the present invention are simply heated in such a manner that vapor of a metal produced from the metal-containing material or vapor of an oxide of the metal can be brought into contact with the composition.

As a specific method, for example, the composition of the present invention and the target metal-containing material are simply placed together in one container, and heated to at least a temperature at which metal vapor or metal oxide vapor of a metal component contained in the metal-containing material is produced. According to this method, the metal vapor or metal oxide vapor of the metal component as a constituent of the metal-containing material, can be brought into contact with the composition of the present invention. In this case, the reaction container does not have to be completely hermetically sealed insofar as the metal vapor or metal oxide vapor of the metal component contained in the metal-containing material can be sufficiently brought into contact with the composition of the present invention. However, sealing performance should be maintained so as to prevent dissipation of the produced vapor.

The heating temperature must be at least a temperature at which the metal component contained in the metal-containing material is converted to metal vapor or metal oxide vapor. Additionally, the heating temperature must be at least a temperature at which the composition of the present invention forms a product containing a perovskite-type complex oxide. The heating temperature is usually about 800° C. or higher, and lower than the decomposition temperature of the product containing a perovskite-type complex oxide formed from the composition. For example, the heating temperature is preferably about 900 to 1,750° C., more preferably about 1,050 to 1,650° C.

Note that, in the case of treating a waste catalyst for purifying automobile exhaust gas, when the heating is performed at a temperature lower than the melting point of ceramic used as a substrate (for example, about 1,200° C. in the case of cordierite), it is possible to collect only a noble metal component while maintaining the shape of the substrate.

In the reaction container, it is sufficient if the metal vapor or metal oxide vapor produced from the metal-containing material can be brought into contact with the composition of the present invention. The target metal-containing material and the composition of the present invention may be either in contact, or not in contact. For example, the following methods can be employed: a heating method in a state where the composition of the present invention is placed on the target metal-containing material; a heating method in a non-contact state where the metal-containing material and the composition of the present invention are arranged at arbitrary intervals in the container; and the like.

Of these methods, the heating method in a non-contact state is advantageous for the following reasons: it does not require pretreatment such as grinding and the like to ensure the contact between the metal-containing material and the composition of the present invention; and the metal-containing material and the product containing a perovskite-type complex oxide, which is formed from the composition of the present invention, are in an easily separable state, and can thus be easily separated after heating. On the other hand, when heating is performed in a contact state, the collection speed can be improved because the distance between the metal-containing material and the composition of the present invention is reduced.

Further, a metal element (Ba, Sr, etc.) contained in the composition of the present invention easily reacts with a metal in the metal-containing material, and forms an alloy or compound having a lower melting point than that of a metal elemental substance. This leads to a reduction in the melting point, allowing metal vapor or metal oxide vapor having a higher pressure (partial pressure) to be produced at a lower temperature, consequently allowing the reaction to proceed in a short time. In particular, in the composition of the present invention, when the ratio of a compound containing an alkaline earth metal (Ba, Sr, etc.) is high, the alkaline earth metal and a metal contained in the metal-containing material react relatively easily with each other, and produce an alloy. This leads to a reduction in the melting point, allowing metal vapor or metal oxide vapor having a higher pressure (partial pressure) to be produced at a lower temperature. In this case, the proportion of the alkaline earth metal is preferably about 10 to 50 atom %, when the total amount of lanthanoid elements and elements in group 2 of the periodic table in the site A compound is defined as 100 atom %.

The pressure (partial pressure) of the metal vapor or metal oxide vapor in the container is not particularly limited. Usually, it is preferably about $10^{-3}$ Pa or higher, more preferably about 1 Pa or higher, and further preferably about $10^2$ Pa or higher.

The reaction time is not particularly limited. When the heating is performed in the above-described temperature range, the reaction time is preferably about 5 to 20 hours, and more preferably about 10 to 15 hours.

In order to help the reaction proceed more quickly, it is preferable to bring the metal vapor or metal oxide vapor having the highest possible pressure (partial pressure) into contact with the composition of the present invention at the highest possible temperature. In order to do so, the reaction is desirably carried out in a state in which the target metal-containing material is preferably in contact with the composition of the present invention; and at a temperature that is lower than the decomposition temperature of a product containing a perovskite-type complex oxide, which is formed from the composition of the present invention, and that is as close to the decomposition temperature as possible.

Note that metal oxide vapor can be produced simply by the presence of oxygen in the container in which the composition of the present invention and the metal-containing material are placed. In this case, it is possible to produce metal oxide vapor having a prescribed pressure at a lower temperature, compared to when producing metal vapor. The partial pressure of oxygen in the container is typically about $10^{-1}$ Pa or higher, and is preferably about $10^4$ Pa or higher.

According to the above method, the target metal component contained in the metal-containing material is occluded in the product containing a complex oxide having a perovskite-type crystal structure, which is formed from the composition of the present invention. The amount of metal component to be occluded can be controlled by varying the tolerance factor of the perovskite-type complex oxide that is formed, amount of oxygen defect in the complex oxide, reaction temperature, pressure (partial pressure) of metal vapor (or metal oxide vapor), and the like. A metal element of up to about 25 atom %, for example, can be occluded, when the total amount of lanthanoid elements and elements in group 2 of the periodic table in the site A compound is defined as 100 atom %.

Note that, in the above method, not all starting materials must form perovskite-type complex oxides as a result of heating of the composition of the present invention; however, perovskite-type complex oxides preferably account for about 90 mol % or more of the product after heating, more preferably about 93 mol % or more, further preferably about 95 mol % or more. Further, depending on the type of starting materials of the composition of the present invention, there is a case where a sufficient amount of metal components is occluded even when a perovskite-type complex oxide accounts for about 70 mol % or more of the product after heating.

The reason that allows a metal component contained in the metal-containing material to be selectively occluded by the above method is unclear. However, it is considered that, first, heating the composition of the present invention at a high temperature results in the formation of a product containing a complex oxide having a perovskite-type structure depending on the compositional ratio of the composition of the present invention, and that the formed product has a site where metal ions are stably contained. When the metal vapor or metal oxide vapor produced by heating the metal-containing material is brought into contact with the product, a metal element contained in the vapor is considered to be partially substituted with a constituent element of the product and forms solid solution with the product, thereby being incorporated and occluded in the product. At this time, especially when the metal-containing material is heated in the presence of oxygen, metal oxide vapor having a partial pressure comparable to that of metal vapor may be produced at a lower temperature. Further, when a basic alkaline earth metal or the like is contained in the composition of the present invention, vapor of the alkaline earth metal or the like is formed upon heating, and brought into contact with the target metal component to be collected, thereby producing an alloy or complex oxide. As a result, the melting point of the metal may be reduced. In these above cases, it is considered that an environment is created in which vapor of the target metal component contained in the metal-containing material is easily produced, and the metal element is efficiently occluded.

Method for Dissolving and Recovering Metal

After the metal component contained in the metal-containing material is occluded in the product formed from the composition of the present invention by the above method, the product in which the metal element is occluded is brought into contact with an acid, and the metal element can thereby be dissolved in the acid.

Examples of acids include, but are not particularly limited to, inorganic acids such as hydrofluoric acid, hydrochloric acid, nitric acid, sulfuric acid, phosphoric acid, etc.; and organic acids such as formic acid, acetic acid, etc. These acids may be used alone, or in a combination of two or more. Examples of mixtures of acids that can be used include aqua regia and the like. Industrially, it is preferable to use hydrochloric acid, sulfuric acid, nitric acid, and the like, which are milder than aqua regia. Sulfuric acid, nitric acid, and the like are particularly preferable in terms of environmental load, because these acids do not produce chloride.

Note that, because noble metals such as iridium, ruthenium, and the like have a lower solubility in aqua regia, it has been considered difficult to collect these metals using a wet method; however, the product containing a perovskite-type complex oxide, which is formed from the composition of the present invention, is easily dissolved in aqua regia and other acids besides aqua regia. Accordingly, noble metals such as iridium, ruthenium, and the like, which are occluded in the product, can be easily dissolved using various acids. The reason therefor is considered to be that although noble metals are not easily affected by acids when a strong metal bond is formed between the noble metal elements, when noble metals are individually incorporated as ions into a lattice such as oxide or the like, and each ion relatively loosely binds to an adjacent anion such as oxide ion or the like, the crystal lattice as a whole can be easily dissolved using an acid.

Although the acid concentration used for dissolving the metal element is not limited, the concentration is preferably as high as possible in view of reaction time, dissolution efficiency, etc. However, when the acid concentration is overly high, the water concentration is relatively low. This may slow down the reaction instead, due to the production of precipitate and the like. Meanwhile, low-concentration acids are preferable in terms of environmental load. The acid concentration may be suitably determined by taking into account these points.

Although the method for bringing a product in which the metal element is occluded into contact with an acid is not particularly limited, the product is usually immersed in an acid; and the acid is heated, if necessary.

The heating temperature may be set to a temperature at which the crystal structure of the product is destroyed in the acid, causing dispersion of its components in the acid, and the metal element contained in the product is dissolved as an ion in the solution. Usually, the temperature may be in the range of from room temperature to a temperature lower than the boiling point of the acid. In view of reaction time and dissolution efficiency in particular, the temperature is preferably about 30° C. to 100° C.

The metal element dissolved in the acid by the above method can be recovered as a solid metal by known methods such as a reduction method using a reducing agent; a recovery method by cementation with metals such as Zn and the like; a recovery method through absorption into an ion-exchange resin or activated carbon; a method in which the process from collection to separation and refinement is carried out by a solvent extraction method; a recovery method by an electrolytic process; and the like. These methods are very useful, particularly when the target to be treated is a waste material containing a noble metal component, rare metal component, and the like, because such high value-added metal components can be efficiently reused at low cost by a simple method.

Further, the acid solution after the metal recovery contains dispersed components of the product in the form of inorganic compounds such as oxide, hydroxide, carbonate, nitrate, sulfate, chloride and the like, or organic compounds. The acid is removed from this acid solution by, for example, heating or reducing pressure, thereby allowing the above components to be collected. These collected components can be reused, as is, as the components of the composition of the present invention in the method of the present invention for collecting a metal.

Advantageous Effects of Invention

The present invention achieves the following significant effects:

(1) With the use of the composition of the present invention, only the target metal component can be efficiently separated and collected by a simple method from various materials comprising a substance containing the target metal component, and other substances.

(2) In particular, when the target to be treated is a waste material containing a noble metal component or rare metal component, such rare and valuable resources (noble metals, rare metals, and the like) can be efficiently collected by a simple method. Moreover, according to the method of the present invention, the metal can be efficiently collected, even if the metal component content in the waste material is low.

(3) The metal element occluded in the product formed from the composition of the present invention can be easily dissolved using various acids; afterward, the metal element can be reused as a solid metal using a known method.

(4) After the metal element is dissolved, the components contained in the acid residue can be reused, as is, as the components of the composition of the present invention for collecting a metal. Consequently, it is economically very useful.

MODE FOR CARRYING OUT INVENTION

The present invention is described below in more detail with reference to Examples.

Example 1

Figure 1:
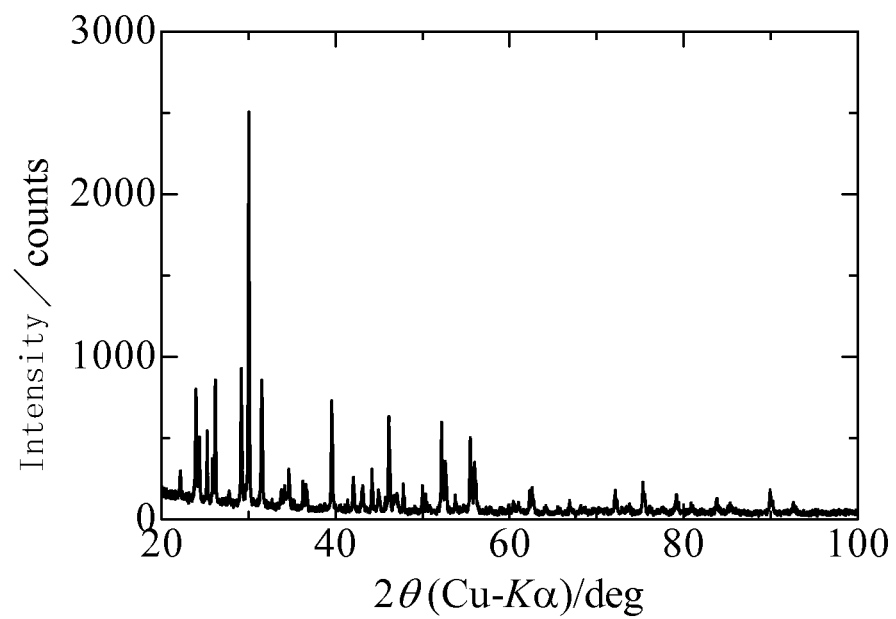
[FIG. 1] An X-ray diffraction pattern of mixed powder of starting materials (colorless) in Example 1.

Collection of Platinum from Platinum Foil Using Starting Material Powder Corresponding to $(La_{0.7}Sr_{0.2}Ba_{0.1})ScO_{2.85}$ $La_2O_3$, $SrCO_3$, $BaCO_3$, and $Sc_2O_3$ were used as starting materials, and weighed so that the element ratio of La:Sr:Ba:Sc was 0.7:0.2:0.1:1.0. Ethanol was then added thereto, and mixed at 300 rpm for 1 hour using a planetary ball mill (zirconia pot and balls). FIG. 1 shows an X-ray diffraction pattern of the obtained mixed powder, and confirms that the powder was a mixture comprising $La_2O_3$, $La(OH)_3$, $SrCO_3$, $BaCO_3$, and $Sc_2O_3$.

The colorless mixed powder (about 2 g) obtained by the aforementioned method was placed in one of two ceramic containers, and platinum foil (thickness: 0.03 mm, weight: 0.4 g) was placed in the other ceramic container. The ceramic containers (made of alumina, rectangular parallelepiped shape, volume: about 30 cm$^3$) each have the same dimensions. Thereafter, these two containers were placed in a ceramic container (made of alumina, rectangular parallelepiped shape, volume: about 400 cm$^3$), and the container was covered with the lid. Subsequently, heat treatment was performed in air at 1500° C. for 10 hours to obtain light blue powder.

Figure 2:
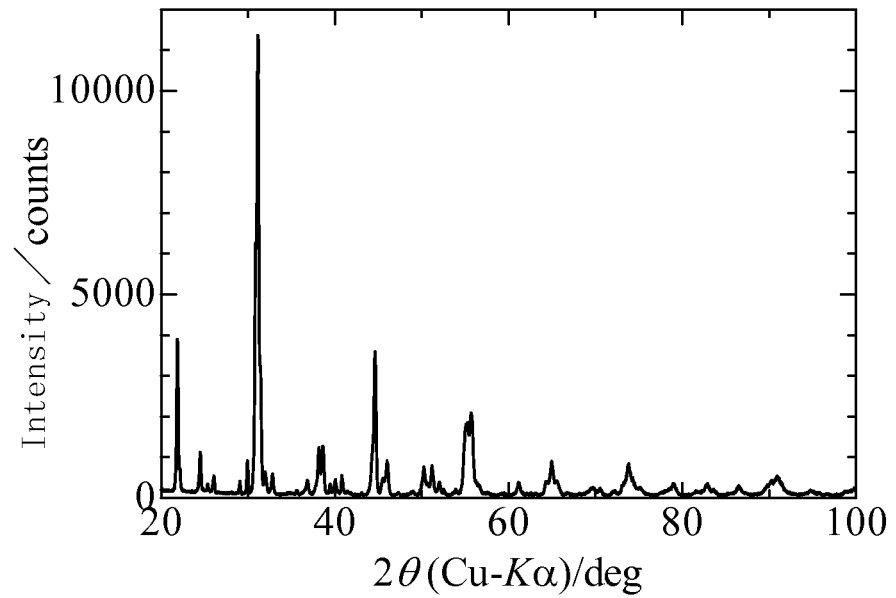
[FIG. 2] An X-ray diffraction pattern of mixed powder after reaction (light blue) in Example 1.

FIG. 2 shows an X-ray diffraction pattern of the obtained powder. The Rietveld analysis revealed that the powder was a mixture comprising 93 mol % of complex oxide that had a perovskite-type structure and comprised La, Sr, Ba, Sc, Pt, and O. The tolerance factor of the perovskite-type complex oxide was 0.92. Further, ICP spectrometry indicated that this mixed powder comprised the elements at a molar ratio of La:Sr:Ba:Sc:Pt=0.7:0.2:0.1:1.0:0.0015. When the ratio was calculated as a weight ratio, Pt/perovskite complex oxide-containing mixture was about 1300 ppm; this value is about several hundred to several thousand times higher than the general concentration of Pt in platinum ore (1 ppm-10 ppm order).

The results confirmed that a product containing the perovskite-type complex oxide was obtained by the above heat treatment, and that Pt was occluded in the product.

Example 2

Collection of Gold from Gold Foil Using Starting Material Powder Corresponding to $(La_{0.7}Sr_{2.2}Ba_{0.1})ScO_{2.85}$ A colorless mixed powder (about 2 g) in which the element ratio of La:Sr:Ba:Sc was 0.7:0.2:0.1:1.0, which was obtained by the same method as in Example 1, was placed in a ceramic container (made of alumina, rectangular parallelepiped shape, volume: about 30 cm$^3$). Gold foil (thickness: 0.03 mm, weight 0.3 g) was placed in the container in such a manner that the foil was not in contact with the mixed powder, and the container was covered with the lid. Subsequently, heat treatment was performed in air at 1525° C. for 100 hours to obtain light red powder.

Figure 3:
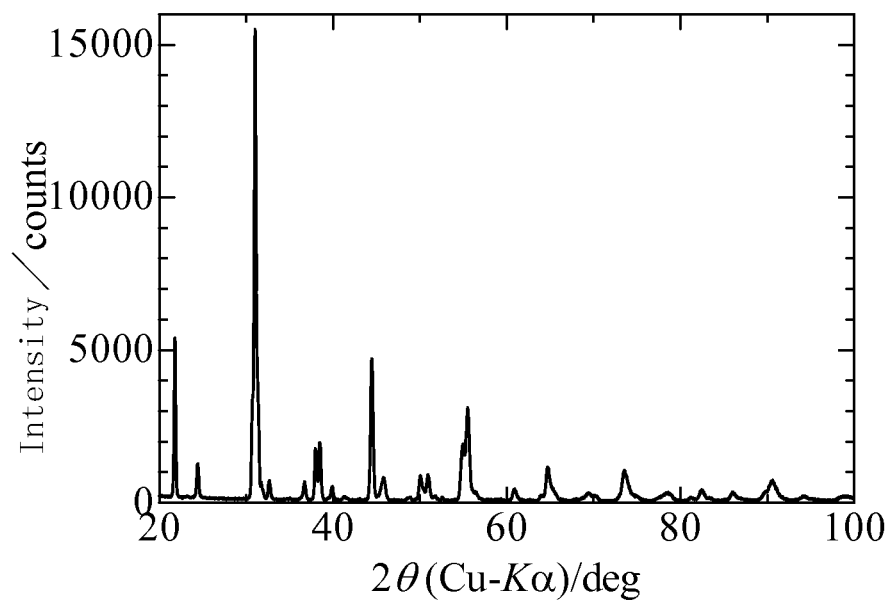
[FIG. 3] An X-ray diffraction pattern of mixed powder after reaction (light red) in Example 2.

FIG. 3 shows an X-ray diffraction pattern of the obtained powder. The Rietveld analysis revealed that the powder was a mixture comprising 97 mol % of complex oxide that had a perovskite-type structure and comprised La, Sr, Ba, Sc, Au, and O. The tolerance factor of the perovskite-type complex oxide was 0.92. Further, ICP spectrometry indicated that this mixed powder comprised the elements at a molar ratio of La:Sr:Ba:Sc:Au=0.7:0.2:0.1:1.0:0.000012. When the ratio was calculated as a weight ratio, Au/perovskite complex oxide-containing mixture was 11 ppm; this value is almost the same as the general concentration of Au in gold ore (1 ppm-10 ppm order).

The results confirmed that a product containing the perovskite-type complex oxide was obtained by the above heat treatment, and that Au was occluded in the product.

Example 3

Collection of Molybdenum from Molybdenum Foil Using Starting Material Powder Corresponding to $(La_{0.7}Sr_{0.2}Ba_{0.1})ScO_{2.85}$ A colorless mixed powder (about 2 g) in which the element ratio of La:Sr:Ba:Sc was 0.7:0.2:0.1:1.0, which was obtained by the same method as in Example 1, was placed in a ceramic container (made of alumina, rectangular parallelepiped shape, volume: about 30 cm$^3$). Molybdenum foil (thickness: 0.05 mm, weight 0.2 g) was placed in the container in such a manner that the foil was not in contact with the mixed powder, and the container was covered with the lid. Subsequently, heat treatment was performed in air at 1600° C. for 10 hours to obtain light green powder.

Figure 4:
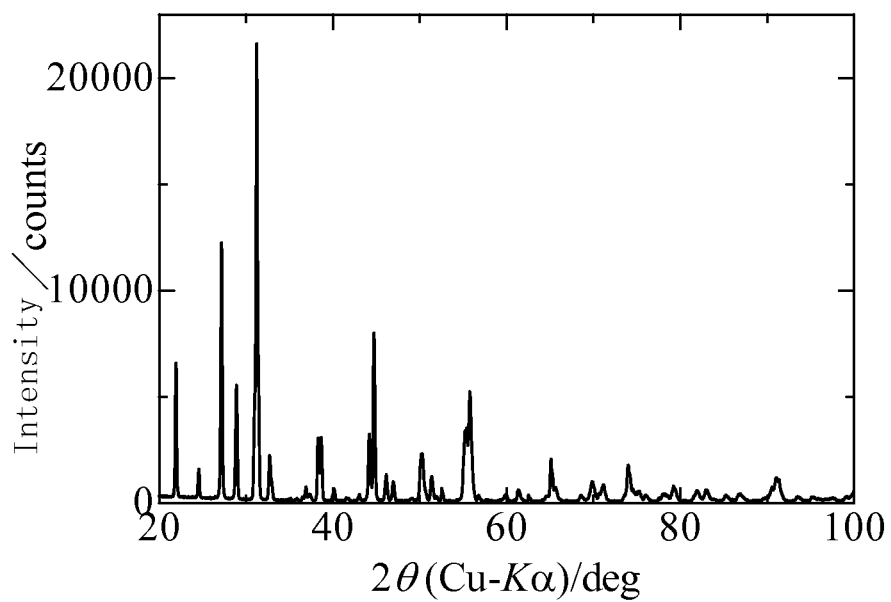
[FIG. 4] An X-ray diffraction pattern of mixed powder after reaction (light green) in Example 3.

FIG. 4 shows an X-ray diffraction pattern of the obtained powder. The Rietveld analysis revealed that the powder was a mixture comprising 71 mol % of complex oxide that had a perovskite-type structure and comprised La, Sr, Ba, Sc, Mo, and O. The tolerance factor of the perovskite-type complex oxide was 0.92. Further, ICP spectrometry indicated that this mixed powder comprised the elements at a molar ratio of La:Sr:Ba:Sc:Mo=0.7:0.2:0.1:1.0:0.25.

The results confirmed that a product containing the perovskite-type complex oxide was obtained by the above heat treatment, and that Mo was occluded in the product.

Example 4

Figure 5:
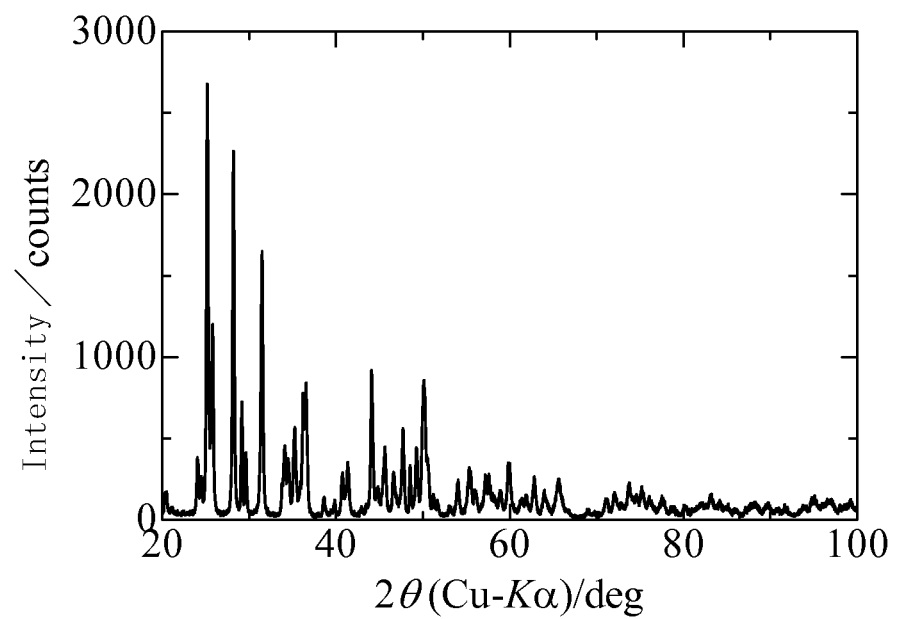
[FIG. 5] An X-ray diffraction pattern of mixed powder of starting materials (colorless) in Example 4.

Collection of Platinum in Platinum-Supported Oxide Catalyst Powder Using Starting Material Powder Corresponding to $Sr(Zr_{0.9}Y_{0.1})O_{2.95}$ $SrCO_3$, $ZrO_2$, and $Y_2O_3$ were used as starting materials, and weighed so that the element ratio of Sr:Zr:Y was 1.0:0.9:0.1. Ethanol was then added thereto, and mixed at 300 rpm for 1 hour using a planetary ball mill (zirconia pot and balls). FIG. 5 shows an X-ray diffraction pattern of the obtained mixed powder, and confirms that the powder is a mixture comprising $SrCO_3$, $ZrO_2$, and $Y_2O_3$.

The colorless mixed powder (about 2 g) obtained by the aforementioned method was placed in a ceramic container (made of alumina, rectangular parallelepiped shape, volume: about 30 cm$^3$). Alumina powder (0.5 g, light yellow) having 1 wt. % of platinum supported thereon was placed in the container in such a manner that the alumina powder was not in contact with the mixed powder, and the container was covered with the lid. Subsequently, heat treatment was performed in air at 1600° C. for 10 hours to obtain light blue powder and colorless alumina powder.

Figure 6:
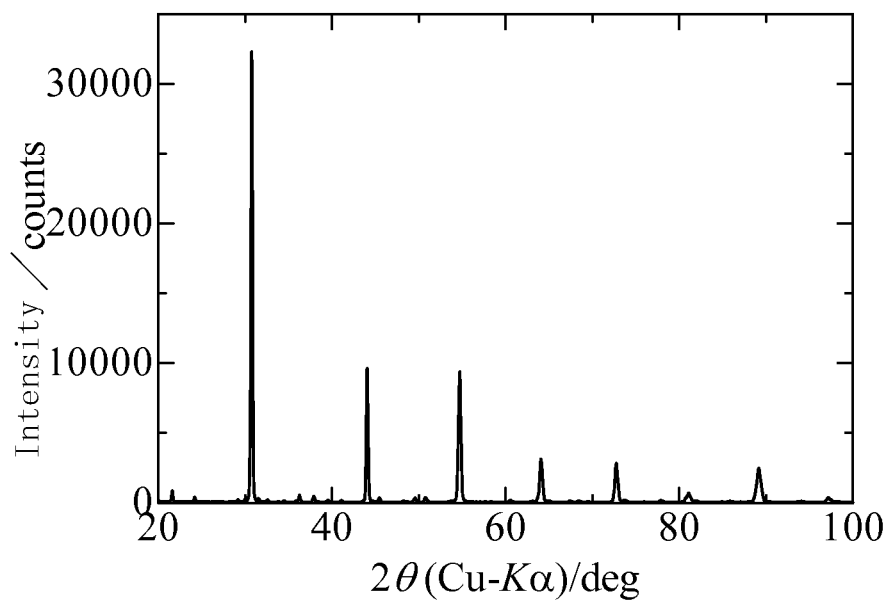
[FIG. 6] An X-ray diffraction pattern of mixed powder after reaction (light blue) in Example 4.

FIG. 6 shows an X-ray diffraction pattern of the obtained powder. The Rietveld analysis revealed that the powder was a mixture comprising 95 mol % of complex oxide that had a perovskite-type structure and comprised Sr, Zr, Y, Pt, and O. The tolerance factor of the perovskite-type complex oxide was 0.94. Further, ICP spectrometry indicated that this mixed powder comprised the elements at a molar ratio of Sr:Zr:Y:Pt=1.0:0.9:0.1:0.00094.

The results confirmed that a product containing the perovskite-type complex oxide was obtained by the above heat treatment, and that Pt was occluded in the product.

Example 5

Collection of Palladium from Palladium Foil Using Starting Material Powder Corresponding to $Sr(Zr_{0.9}Y_{0.1})O_{2.95}$ A colorless mixed powder (about 2 g) in which the element ratio of Sr:Zr:Y was 1.0:0.9:0.1, which was obtained by the same method as in Example 4, was placed in a ceramic container (made of alumina, rectangular parallelepiped shape, volume: about 30 cm³). Palladium foil (thickness: 0.03 mm, weight 0.2 g) was placed in the container in such a manner that the foil was not in contact with the mixed powder, and the container was covered with the lid. Subsequently, heat treatment was performed in air at 1600° C. for 10 hours to obtain light brown powder.

Figure 7:
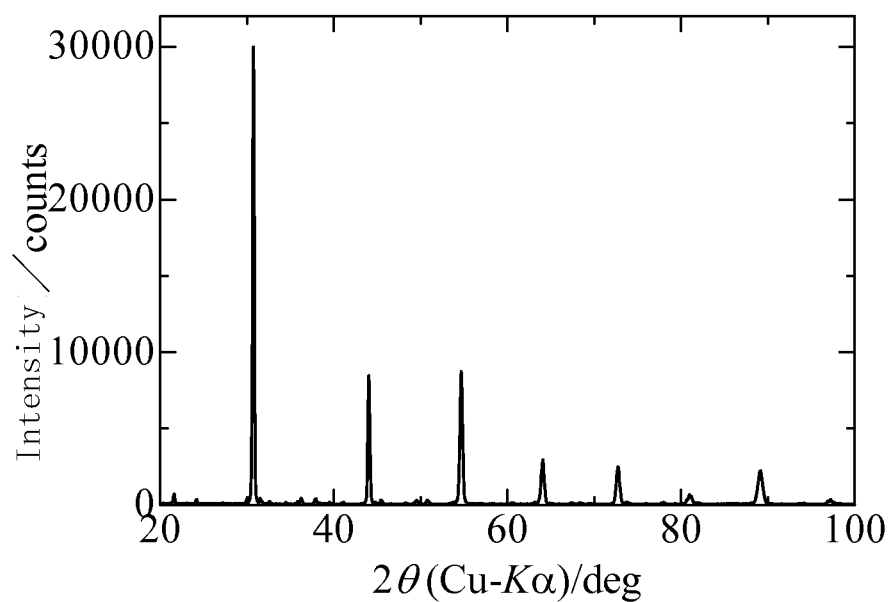
[FIG. 7] An X-ray diffraction pattern of mixed powder after reaction (light brown) in Example 5.

FIG. 7 shows an X-ray diffraction pattern of the obtained powder. The Rietveld analysis revealed that the powder was a mixture comprising 98 mol % of complex oxide that had a perovskite-type structure and comprised Sr, Zr, Y, Pd, and O. The tolerance factor of the perovskite-type complex oxide was 0.94. Further, ICP spectrometry indicated that this mixed powder comprised the elements at a molar ratio of Sr:Zr:Y:Pd=1.0:0.9:0.1:0.00034.

The results confirmed that a product containing the perovskite-type complex oxide was obtained by the above heat treatment, and that Pd was occluded in the product.

Example 6

Collection of Rhodium in Rhodium-Supported Oxide Catalyst Powder Using Starting Material Powder Corresponding to $Sr(Zr_{0.9}Y_{0.1})O_{2.95}$ A colorless mixed powder (about 2 g) in which the element ratio of Sr:Zr:Y was 1.0:0.9:0.1, which was obtained by the same method as in Example 4, was placed in a ceramic container (made of alumina, rectangular parallelepiped shape, volume: about 30 cm³). Alumina powder (0.5 g, light greenish brown) having 1 wt. % of rhodium supported thereon was placed in the container in such a manner that the alumina powder was not in contact with the mixed powder, and the container was covered with the lid. Subsequently, heat treatment was performed in air at 1600° C. for 10 hours to obtain blue powder and colorless alumina powder.

Figure 8:
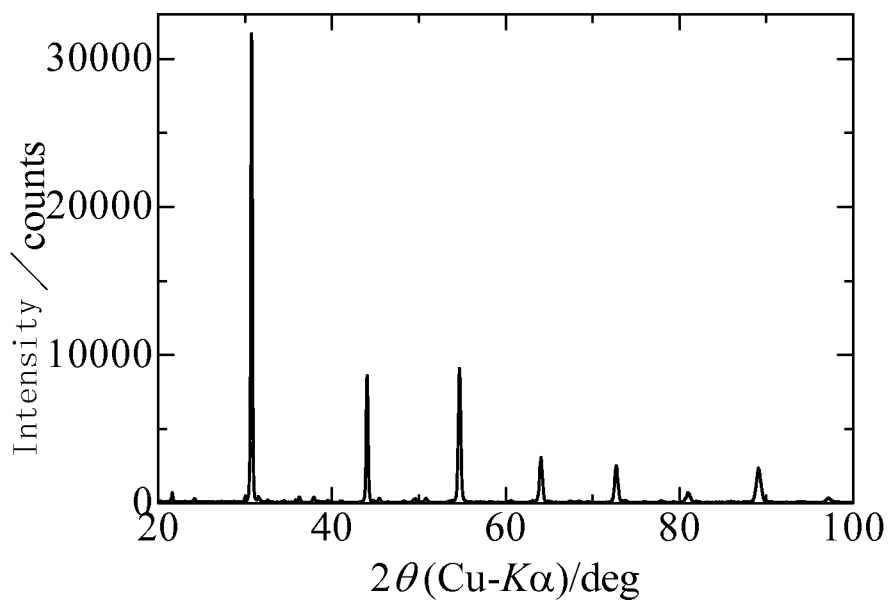
[FIG. 8] An X-ray diffraction pattern of mixed powder after reaction (blue) in Example 6.

FIG. 8 shows an X-ray diffraction pattern of the obtained powder. The Rietveld analysis revealed that the powder was a mixture comprising 98 mol % of complex oxide that had a perovskite-type structure and comprised Sr, Zr, Y, Rh, and O. The tolerance factor of the perovskite-type complex oxide was 0.94. Further, ICP spectrometry indicated that this mixed powder comprised the elements at a molar ratio of Sr:Zr:Y:Rh=1.0:0.9:0.1:0.0034.

The results confirmed that a product containing the perovskite-type complex oxide was obtained by the above heat treatment, and that Rh was occluded in the product.

Example 7

Collection of Iridium in Iridium-Supported Oxide Catalyst Powder Using Starting Material Powder Corresponding to $Sr(Zr_{0.9}Y_{0.1})O_{2.95}$ A colorless mixed powder (about 2 g) in which the element ratio of Sr:Zr:Y was 1.0:0.9:0.1, which was obtained by the same method as in Example 4, was placed in a ceramic container (made of alumina, rectangular parallelepiped shape, volume: about 30 cm³). Alumina powder (0.6 g, blue) having 1.5 wt. % of iridium supported thereon was placed in the container in such a manner that the alumina powder was not in contact with the mixed powder, and the container was covered with the lid. Subsequently, heat treatment was performed in air at 1600° C. for 10 hours to obtain brown powder and colorless alumina powder.

Figure 9:
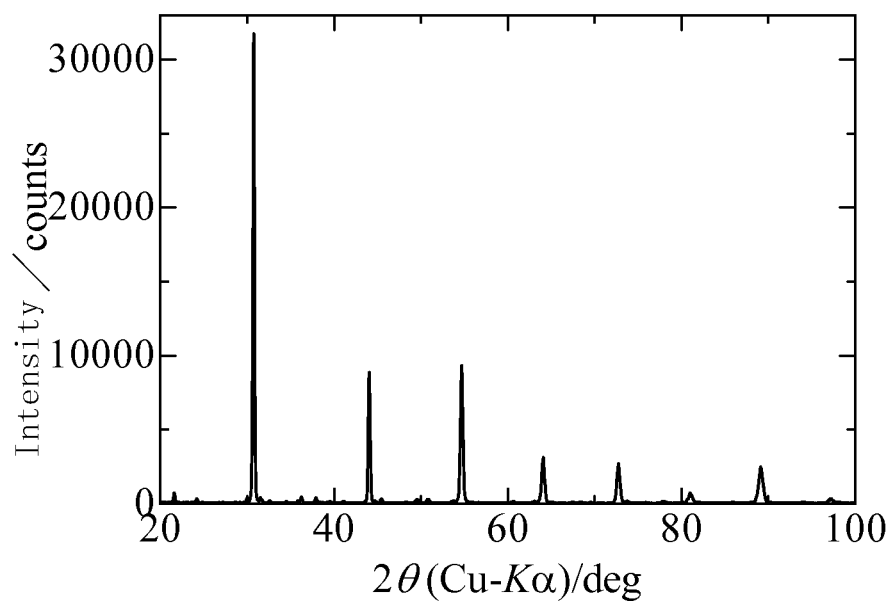
[FIG. 9] An X-ray diffraction pattern of mixed powder after reaction (brown) in Example 7.

FIG. 9 shows an X-ray diffraction pattern of the obtained powder. The Rietveld analysis revealed that the powder was a mixture comprising 98 mol % of complex oxide that had a perovskite-type structure and comprised Sr, Zr, Y, Ir, and O. The tolerance factor of the perovskite-type complex oxide was 0.94. Further, ICP spectrometry indicated that this mixed powder comprised the elements at a molar ratio of Sr:Zr:Y:Ir=1.0:0.9:0.1:0.0039.

The results confirmed that a product containing the perovskite-type complex oxide was obtained by the above heat treatment, and that Ir was occluded in the product.

Example 8

Collection of Ruthenium in Ruthenium-Supported Oxide Catalyst Powder Using Starting Material Powder Corresponding to $Sr(Zr_{0.9}Y_{0.1})O_{2.95}$ A colorless mixed powder (about 2 g) in which the element ratio of Sr:Zr:Y was 1.0:0.9:0.1, which was obtained by the same method as in Example 4, was placed in a ceramic container (made of alumina, rectangular parallelepiped shape, volume: about 30 cm³). Alumina powder (0.7 g, green) having 1 wt. % of ruthenium supported thereon was placed in the container in such a manner that the alumina powder was not in contact with the mixed powder, and the container was covered with the lid. Subsequently, heat treatment was performed in air at 1600° C. for 10 hours to obtain orange powder and colorless alumina powder.

Figure 10:
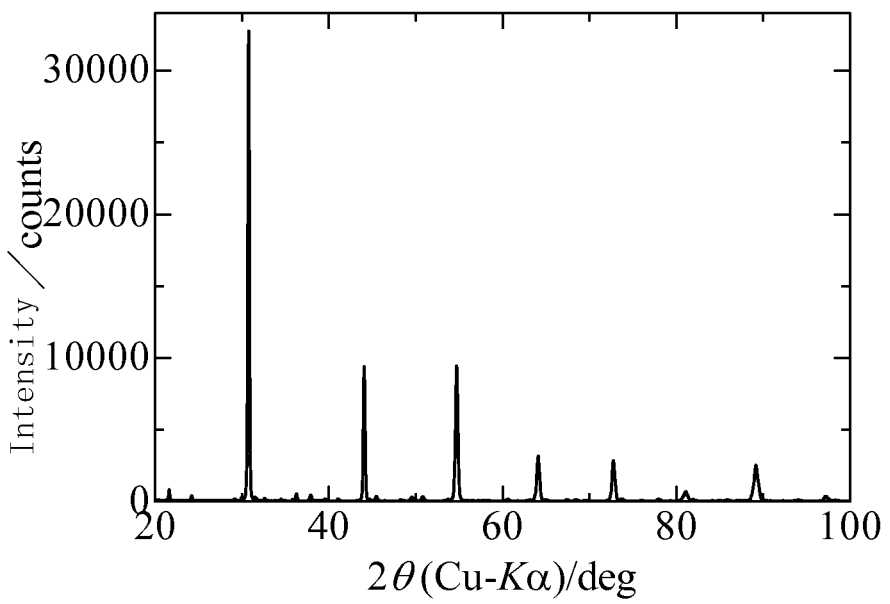
[FIG. 10] An X-ray diffraction pattern of mixed powder after reaction (orange) in Example 8.

FIG. 10 shows an X-ray diffraction pattern of the obtained powder. The Rietveld analysis revealed that the powder was a mixture comprising 98 mol % of complex oxide that had a perovskite-type structure and comprised Sr, Zr, Y, Ru, and O. The tolerance factor of the perovskite-type complex oxide was 0.94. Further, ICP spectrometry indicated that this mixed powder comprised the elements at a molar ratio of Sr:Zr:Y:Ru=1.0:0.9:0.1:0.008.

The results confirmed that a product containing the perovskite-type complex oxide was obtained by the above heat treatment, and that Ru was occluded in the product.

Example 9

Collection of Rhenium from Rhenium Foil Using Starting Material Powder Corresponding to $Sr(Zr_{0.9}Y_{0.1})O_{2.95}$ A colorless mixed powder (about 2 g) in which the element ratio of Sr:Zr:Y was 1.0:0.9:0.1, which was obtained by the same method as in Example 4, was placed in a ceramic container (made of alumina, rectangular parallelepiped shape, volume: about 30 cm³). Rhenium foil (thickness: 0.03 mm, weight 0.1 g) was placed in the container in such a manner that the foil was not in contact with the mixed powder, and the container was covered with the lid. Subsequently, heat treatment was performed in air at 1600° C. for 10 hours to obtain pale yellow powder.

Figure 11:
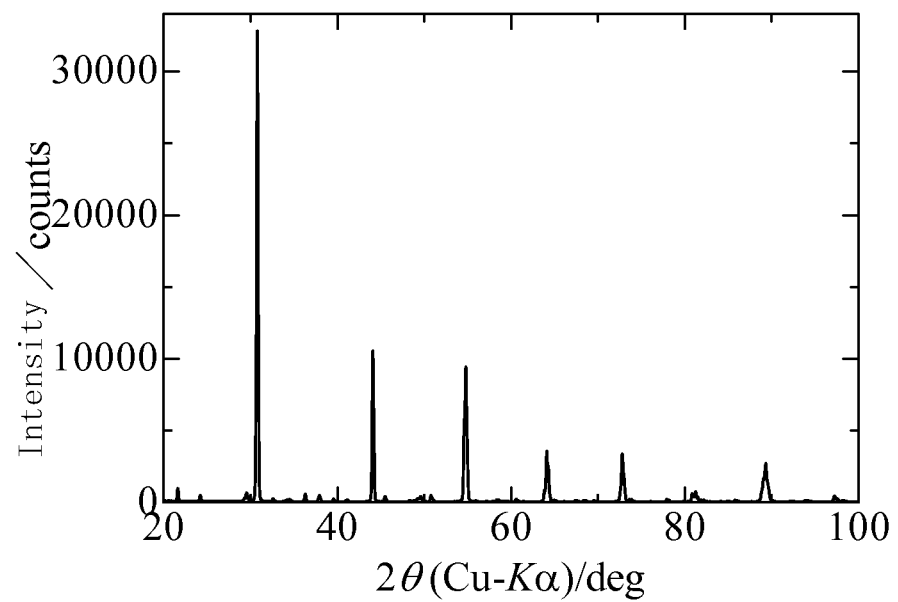
[FIG. 11] An X-ray diffraction pattern of mixed powder after reaction (pale yellow) in Example 9.

FIG. 11 shows an X-ray diffraction pattern of the obtained powder. The Rietveld analysis revealed that the powder was a mixture comprising 99 mol % of complex oxide that had a perovskite-type structure and comprised Sr, Zr, Y, Re, and O. The tolerance factor of the perovskite-type complex oxide was 0.94.

Further, ICP spectrometry indicated that this mixed powder comprised the elements at a molar ratio of Sr:Zr:Y:Re=1.0:0.9:0.1:0.0034.

The results confirmed that a product containing the perovskite-type complex oxide was obtained by the above heat treatment, and that Re was occluded in the product.

Example 10

Collection of Tungsten from Tungsten Foil Using Starting Material Powder Corresponding to $Sr(Zr_{0.9}Y_{0.1})O_{2.95}$ A colorless mixed powder (about 2 g) in which the element ratio of Sr:Zr:Y was 1.0:0.9:0.1, which was obtained by the same method as in Example 4, was placed in a ceramic container (made of alumina, rectangular parallelepiped shape, volume: about 30 cm$^3$). Tungsten foil (thickness: 0.03 mm, weight 0.26 g) was placed in the container in such a manner that the foil was not in contact with the mixed powder, and the container was covered with the lid. Subsequently, heat treatment was performed in air at 1600° C. for 10 hours to obtain light yellow powder.

Figure 12:
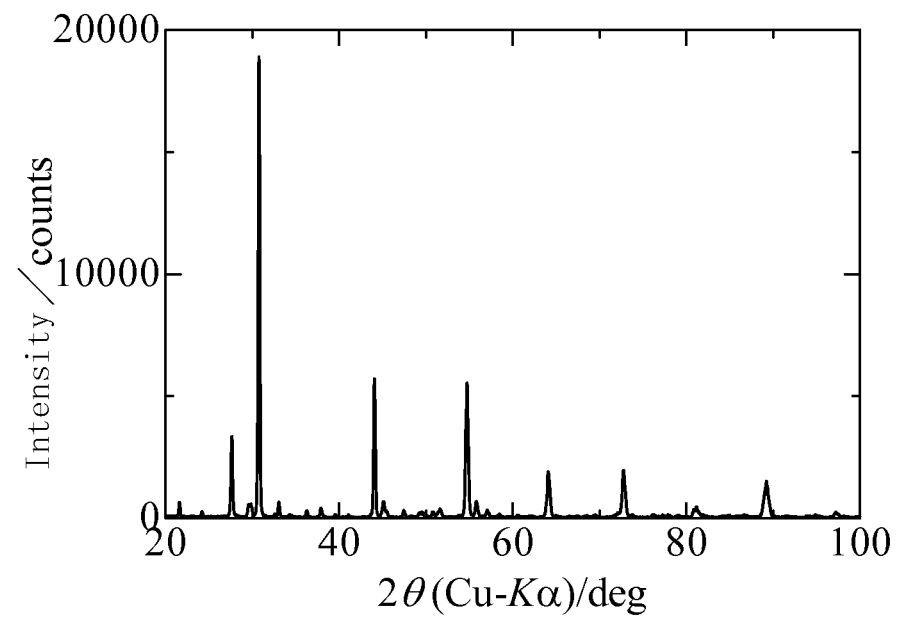
[FIG. 12] An X-ray diffraction pattern of mixed powder after reaction (light yellow) in Example 10.

FIG. 12 shows an X-ray diffraction pattern of the obtained powder. The Rietveld analysis revealed that the powder was a mixture comprising 89 mol % of complex oxide that had a perovskite-type structure and comprised Sr, Zr, Y, W, and O. The tolerance factor of the perovskite-type complex oxide was 0.94. Further, ICP spectrometry indicated that this mixed powder comprised the elements at a molar ratio of Sr:Zr:Y:W=1.0:0.84:0.09:0.14.

The results confirmed that a product containing the perovskite-type complex oxide was obtained by the above heat treatment, and that W was occluded in the product.

Example 11

Collection of Platinum and Rhodium from Platinum/Rhodium Heat Coil Using Starting Material Powder Corresponding to $Sr(Zr_{0.9}Y_{0.1})O_{2.95}$ A colorless mixed powder (about 2 g) in which the element ratio of Sr:Zr:Y was 1.0:0.9:0.1, which was obtained by the same method as in Example 4, was placed in a ceramic container (made of alumina, rectangular parallelepiped shape, volume: about 30 cm$^3$). Heater scrap(comprising a platinum-rhodium alloy heat coil in alumina cement (weight ratio of platinum:rhodium=7:3; weight: 8.6 g)) was placed in the container in such a manner that the heater scrap was not in contact with the mixed powder, and the container was covered with the lid. Subsequently, heat treatment was performed in air at 1600° C. for 10 hours to obtain light reddish purple powder.

Figure 13:
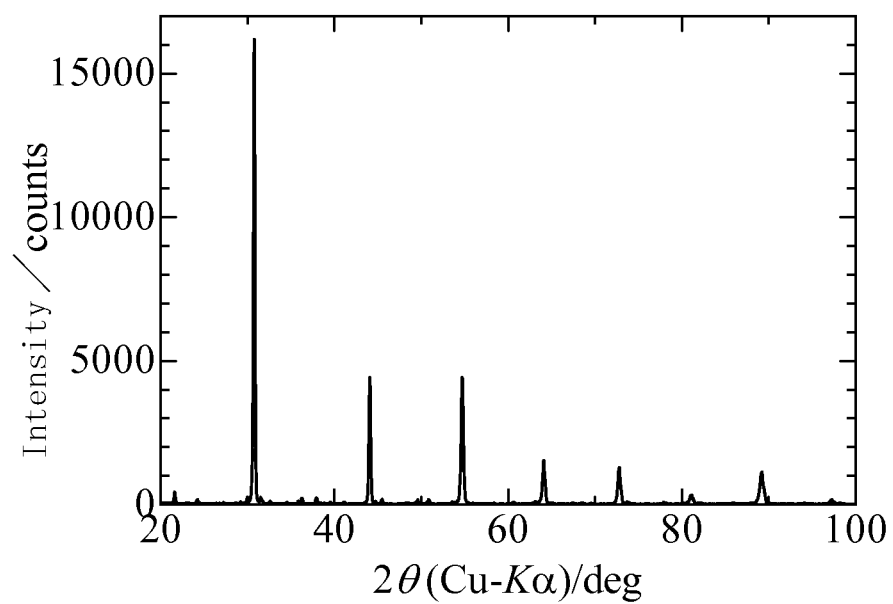
[FIG. 13] An X-ray diffraction pattern of mixed powder after reaction (light reddish purple) in Example 11.

FIG. 13 shows an X-ray diffraction pattern of the obtained powder. The Rietveld analysis revealed that the powder was a mixture comprising 97 mol % of complex oxide that had a perovskite-type structure and comprised Sr, Zr, Y, Pt, Rh, and O. The tolerance factor of the perovskite-type complex oxide was 0.94. Further, ICP spectrometry indicated that this mixed powder comprised the elements at a molar ratio of Sr:Zr:Y:Pt:Rh=1.0:0.9:0.1:0.0004:0.0007.

The results confirmed that a product containing the perovskite-type complex oxide was obtained by the above heat treatment, and that Pt and Rh were occluded in the product.

Example 12

Figure 14:
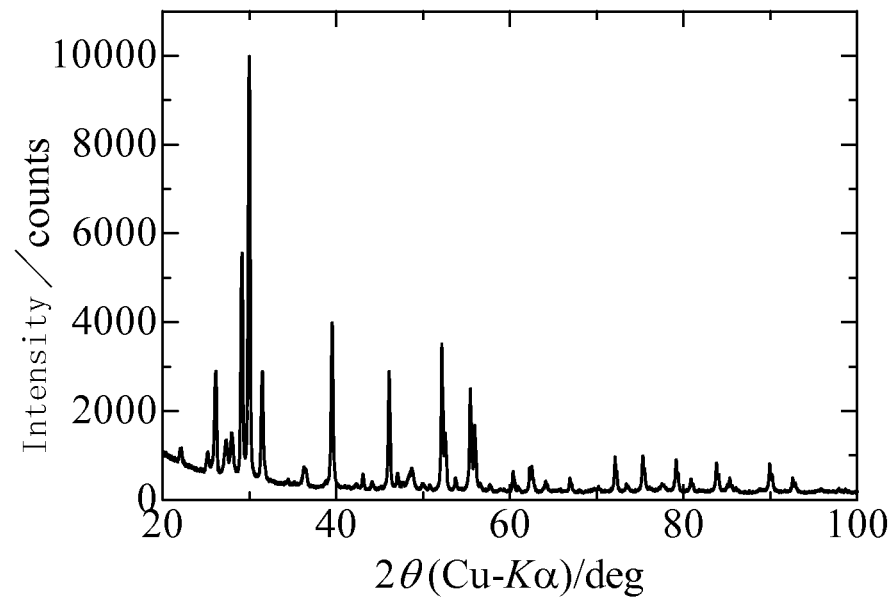
[FIG. 14] An X-ray diffraction pattern of mixed powder of starting materials (colorless) in Example 12.

Collection of Ruthenium from Ruthenium Oxide Powder Using Starting Material Powder Corresponding to $(La_{0.9}Sr_{0.1})(Sc_{0.95}Zn_{0.05})O_{2.925}$ $La_2O_3$, $SrCO_3$, $SC_2O_3$, and ZnO were used as starting materials, and weighed so that the element ratio of La:Sr:Sc:Zn was 0.9:0.1:0.95:0.05. Ethanol was then added thereto, and mixed at 300 rpm for 1 hour using a planetary ball mill (zirconia pot and balls). FIG. 14 shows an X-ray diffraction pattern of the obtained colorless mixed powder, and confirms that the powder was a mixture comprising $La_2O_3$, $La(OH)_3$, $SrCO_3$, $Sc_2O_3$, and ZnO.

The colorless mixed powder (about 2 g) obtained by the aforementioned method was placed in a ceramic container (made of alumina, rectangular parallelepiped shape, volume: about 30 cm$^3$). Ruthenium oxide ($RuO_2$) powder (weight: 0.1 g) was placed in the container in such a manner that the powder was not in contact with the mixed powder, and the container was covered with the lid. Subsequently, heat treatment was performed in air at 1200° C. for 10 hours to obtain black powder.

Figure 15:
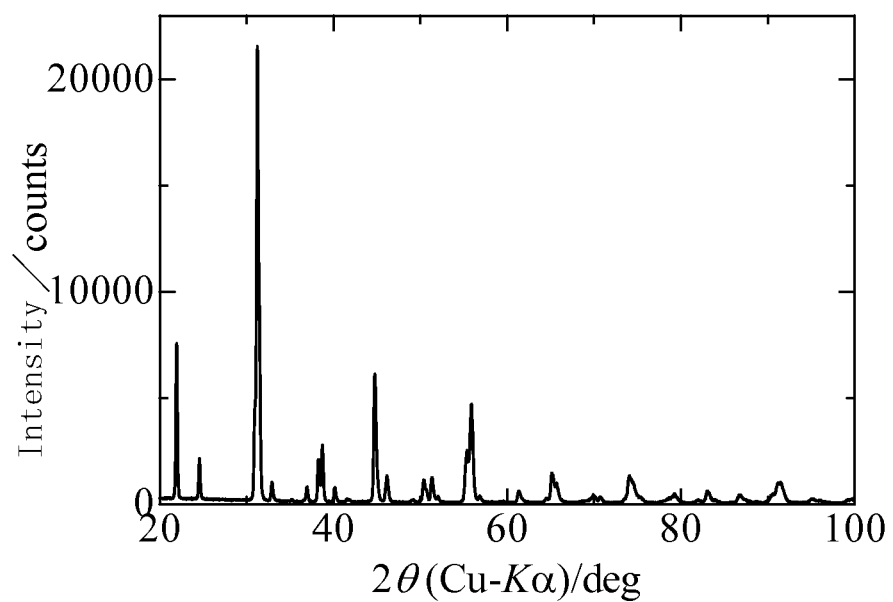
[FIG. 15] An X-ray diffraction pattern of mixed powder after reaction (black) in Example 12.

FIG. 15 shows an X-ray diffraction pattern of the obtained powder. The Rietveld analysis revealed that the powder was a mixture comprising 95 mol % of complex oxide that had a perovskite-type structure and comprised La, Sr, Sc, Zn, Ru, and O. The tolerance factor of the perovskite-type complex oxide was 0.91. Further, ICP spectrometry indicated that this mixed powder comprised the elements at a molar ratio of La:Sr:Sc:Zn:Ru=0.9:0.1:0.95:0.05:0.05.

The results confirmed that a product containing the perovskite-type complex oxide was obtained by the above heat treatment, and that Ru was occluded in the product.

Example 13

Figure 16:
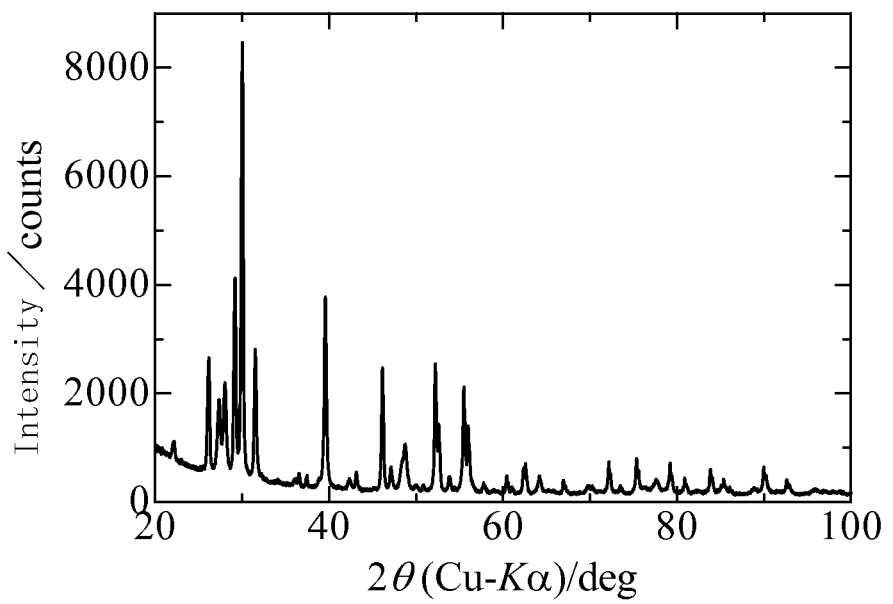
[FIG. 16] An X-ray diffraction pattern of mixed powder of starting materials (colorless) in Example 13.

Collection of Platinum from Platinum Foil Using Starting Material Powder Corresponding to $(La_{0.9}Ca_{0.1})(Sc_{0.95}Al_{0.05})O_{2.95}$ $La_2O_3$, CaO, $Sc_2O_3$, and $Al_2O_3$ were used as starting materials, and weighed so that the element ratio of La:Ca:Sc:Al was 0.9:0.1:0.95:0.05. Ethanol was then added thereto, and mixed at 300 rpm for 1 hour using a planetary ball mill (zirconia pot and balls). FIG. 16 shows an X-ray diffraction pattern of the obtained colorless mixed powder, and confirms that the powder was a mixture comprising $La_2O_3$, $La(OH)_3$, CaO, $Sc_2O_3$, and $Al_2O_3$.

The colorless mixed powder (about 2 g) obtained by the aforementioned method was put on platinum foil (thickness: 0.03 mm, weight 1.0 g), and placed in a ceramic container (made of alumina, rectangular parallelepiped shape, volume: about 30 cm$^3$). The container was then covered with the lid. Subsequently, heat treatment was performed in air at 1600° C. for 10 hours to obtain light brown powder.

Figure 17:
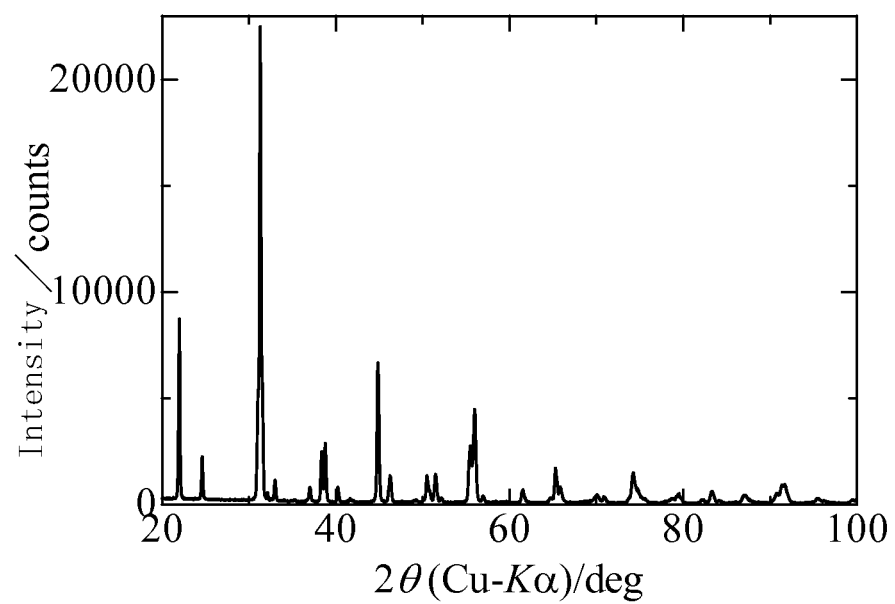
[FIG. 17] An X-ray diffraction pattern of mixed powder after reaction (light brown) in Example 13.

FIG. 17 shows an X-ray diffraction pattern of the obtained powder. The Rietveld analysis revealed that the powder was a mixture comprising 97 mol % of complex oxide that had a perovskite-type structure and comprised La, Ca, Sc, Al, Pt, and O. The tolerance factor of the perovskite-type complex oxide was 0.91. Further, ICP spectrometry indicated that this mixed powder comprised the elements at a molar ratio of La:Ca:Sc:Al:Pt=0.9:0.1:0.95:0.05:0.0046.

The results confirmed that a product containing the perovskite-type complex oxide was obtained by the above heat treatment, and that Pt was occluded in the product.

Example 14

Figure 18:
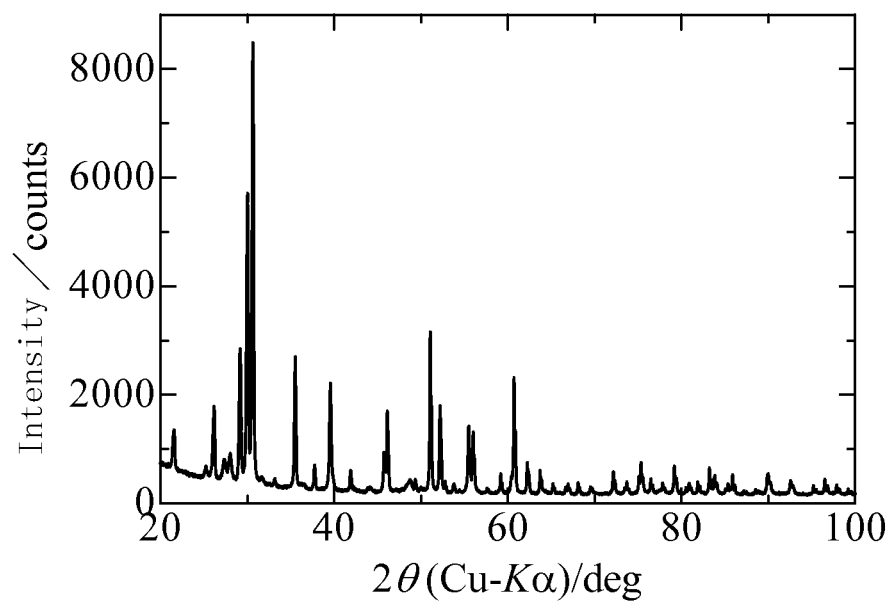
[FIG. 18] An X-ray diffraction pattern of mixed powder of starting materials (light yellow) in Example 14.

Collection of Platinum from Platinum Foil Using Starting Material Powder Corresponding to $(La_{0.9}Sr_{0.1})InO_{2.95}$ $La_2O_3$, $SrCO_3$, and $In_2O_3$ were used as starting materials, and weighed so that the element ratio of La:Sr:In was 0.9:0.1:1.0. Ethanol was then added thereto, and mixed at 300 rpm for 1 hour using a planetary ball mill (zirconia pot and balls). FIG. 18 shows an X-ray diffraction pattern of the obtained light yellow mixed powder, and confirms that the powder was a mixture comprising $La_2O_3$, $La(OH)_3$, $SrCO_3$, and $In_2O_3$.

The light yellow mixed powder (about 2 g) obtained by the aforementioned method was put on platinum foil (thickness: 0.03 mm, weight 0.9 g), and placed in a ceramic container (made of alumina, rectangular parallelepiped shape, volume: about 30 cm³). The container was then covered with the lid. Subsequently, heat treatment was performed in air at 1500° C. for 10 hours to obtain light blue powder.

Figure 19:
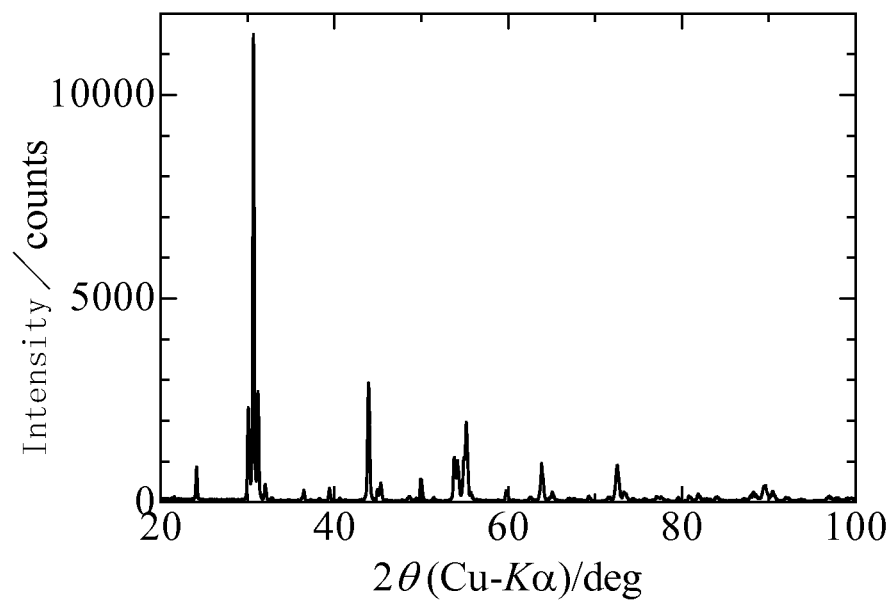
[FIG. 19] An X-ray diffraction pattern of mixed powder after reaction (light blue) in Example 14.

FIG. 19 shows an X-ray diffraction pattern of the obtained powder. The Rietveld analysis revealed that the powder was a mixture comprising 99 mol % of complex oxide that had a perovskite-type structure and comprised La, Sr, In, Pt, and O. The tolerance factor of the perovskite-type complex oxide was 0.89. Further, ICP spectrometry indicated that this mixed powder comprised the elements at a molar ratio of La:Sr:In:Pt=0.9:0.1:1.0:0.0084.

The results confirmed that a product containing the perovskite-type complex oxide was obtained by the above heat treatment, and that Pt was occluded in the product.

Example 15

Figure 20:
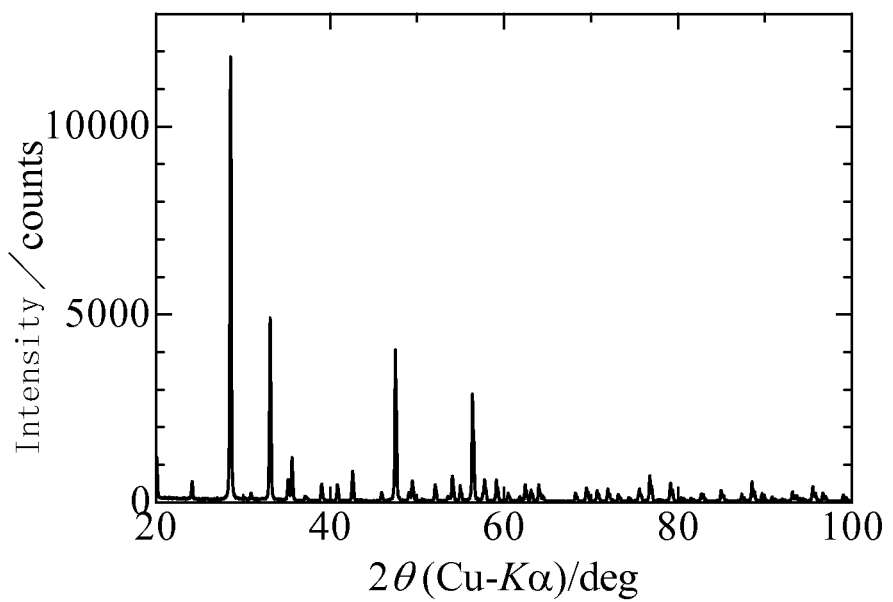
[FIG. 20] An X-ray diffraction pattern of mixed powder of starting materials (reddish brown) in Example 15.

Collection of Platinum from Platinum Foil Using Starting Material Powder Corresponding to $(Gd_{0.9}Ca_{0.1})FeO_{2.95}$ $Gd_2O_3$, CaO, and $Fe_2O_3$ were used as starting materials, and weighed so that the element ratio of Gd:Ca:Fe was 0.9:0.1:1.0. Ethanol was then added thereto, and mixed at 300 rpm for 1 hour using a planetary ball mill (zirconia pot and balls). FIG. 20 shows an X-ray diffraction pattern of the obtained reddish brown mixed powder, and confirms that the powder was a mixture comprising $Gd_2O_3$, CaO, and $Fe_2O_3$.

The reddish brown mixed powder (about 2 g) obtained by the aforementioned method was put on platinum foil (thickness: 0.03 mm, weight 1.0 g), and placed in a ceramic container (made of alumina, rectangular parallelepiped shape, volume: about 30 cm³). The container was then covered with the lid. Subsequently, heat treatment was performed in air at 1500° C. for 10 hours to obtain black powder.

Figure 21:
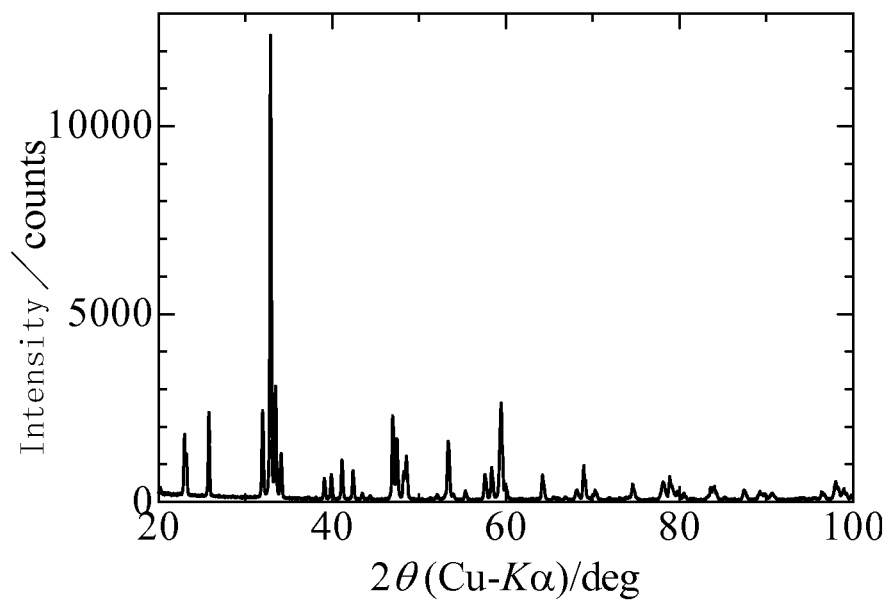
[FIG. 21] An X-ray diffraction pattern of mixed powder after reaction (black) in Example 15.

FIG. 21 shows an X-ray diffraction pattern of the obtained powder. The Rietveld analysis revealed that the powder was a complex oxide that had a perovskite-type structure and comprised Gd, Ca, Fe, Pt, and O. The tolerance factor of the perovskite-type complex oxide was 0.88. Further, ICP spectrometry indicated that this mixed powder comprised the elements at a molar ratio of Gd:Ca:Fe:Pt=0.9:0.1:1.0:0.003.

The results confirmed that a perovskite-type complex oxide was obtained by the above heat treatment, and that Pt was occluded in the product.

Example 16

Figure 22:
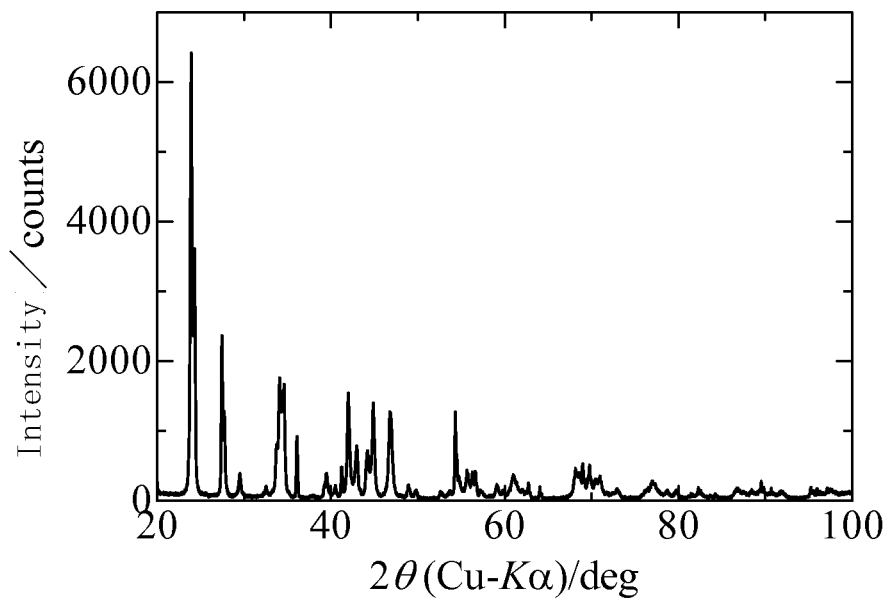
[FIG. 22] An X-ray diffraction pattern of mixed powder of starting materials (colorless) in Example 16.

Collection of Platinum from Platinum Foil Using Starting Material Powder Corresponding to $Ba(Ti_{0.9}Al_{0.1})O_{2.95}$ $BaCO_3$, $TiO_2$, and $Al_2O_3$ were used as starting materials, and weighed so that the element ratio of Ba:Ti:Al was 1.0:0.9:0.1. Ethanol was then added thereto, and mixed at 300 rpm for 1 hour using a planetary ball mill (zirconia pot and balls). FIG. 22 shows an X-ray diffraction pattern of the obtained colorless mixed powder, and confirms that the powder was a mixture comprising $BaCO_3$, $TiO_2$, and $Al_2O_3$.

The colorless mixed powder (about 2 g) obtained by the aforementioned method was placed in one of two ceramic containers, and platinum foil (thickness: 0.03 mm, weight: 0.4 g) was placed in the other ceramic container. The ceramic containers (made of alumina, rectangular parallelepiped shape, volume: 30 cm³) each have the same dimensions. Thereafter, these two containers were placed in a ceramic container (made of alumina, rectangular parallelepiped shape, volume: about 400 cm³), and the container was covered with the lid. Subsequently, heat treatment was performed in air at 1300° C. for 10 hours to obtain light blue powder.

Figure 23:
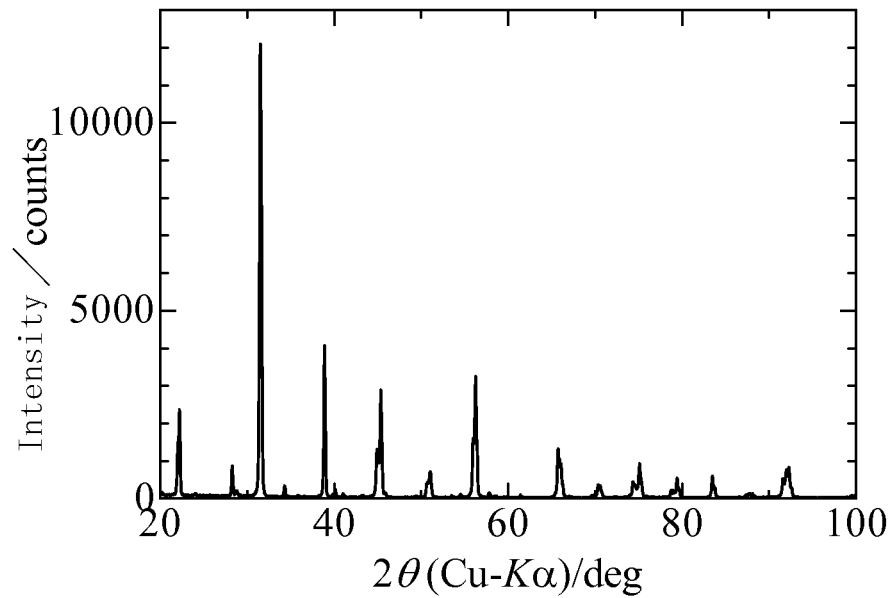
[FIG. 23] An X-ray diffraction pattern of mixed powder after reaction (light blue) in Example 16.

FIG. 23 shows an X-ray diffraction pattern of the obtained powder. The Rietveld analysis revealed that the powder was a mixture comprising 95 mol % of complex oxide that had a perovskite-type structure and comprised Ba, Ti, Al, Pt, and O. The tolerance factor of the perovskite-type complex oxide was 1.07. Further, ICP spectrometry indicated that this mixed powder comprised the elements at a molar ratio of Ba:Ti:Al:Pt=1.0:0.9:0.1:0.0001.

The results confirmed that a product containing the perovskite-type complex oxide was obtained by the above heat treatment, and that Pt was occluded in the product.

Example 17

Figure 24:
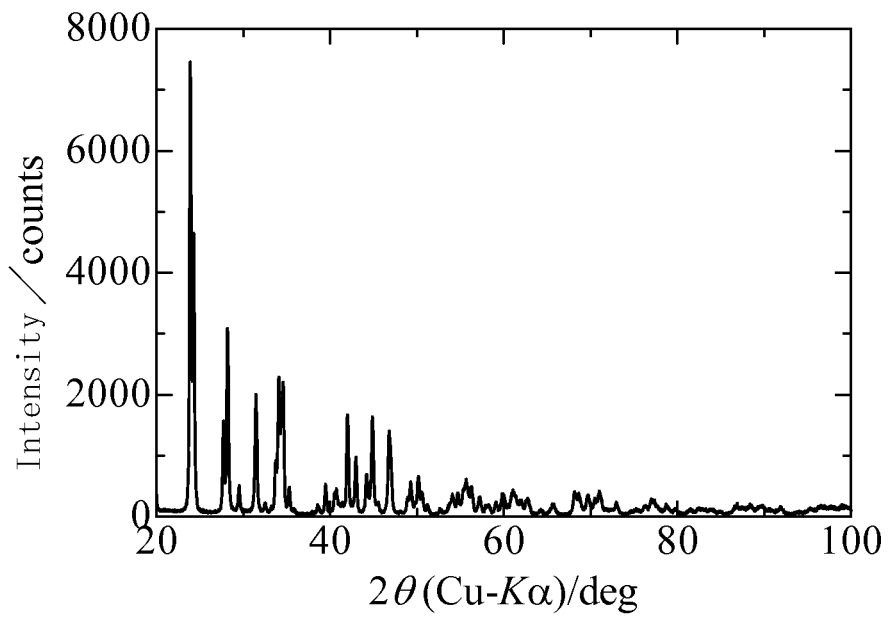
[FIG. 24] An X-ray diffraction pattern of mixed powder of starting materials (colorless) in Example 17.

Collection of Platinum from Platinum Foil Using Starting Material Powder Corresponding to $BaZrO_3$ $BaCO_3$ and $ZrO_2$ were used as starting materials, and weighed so that the element ratio of Ba:Zr was 1.0:1.0. Ethanol was then added thereto, and mixed at 300 rpm for 1 hour using a planetary ball mill (zirconia pot and balls). FIG. 24 shows an X-ray diffraction pattern of the obtained colorless mixed powder, and confirms that the powder was a mixture comprising $BaCO_3$ and $zrO_2$.

The colorless mixed powder (about 2 g) obtained by the aforementioned method was placed in a ceramic container (made of alumina, rectangular parallelepiped shape, volume: about 30 cm³). Platinum foil (thickness: 0.03 mm, weight 0.2 g) was placed in the container in such a manner that the foil was not in contact with the mixed powder, and the container was covered with the lid. Subsequently, heat treatment was performed in air at 1600° C. for 10 hours to obtain light yellowish brown powder.

Figure 25:
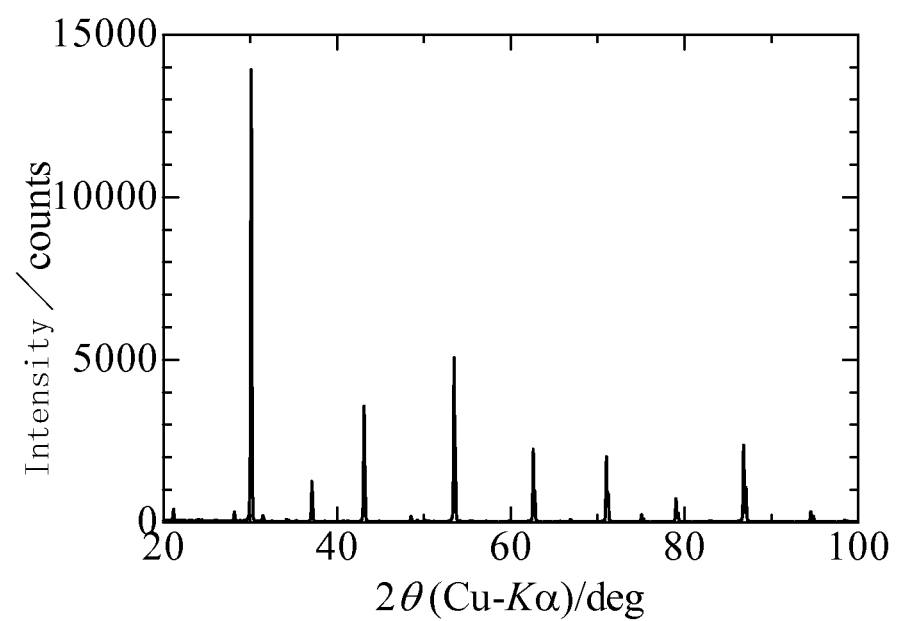
[FIG. 25] An X-ray diffraction pattern of mixed powder after reaction (light yellowish brown) in Example 17.

FIG. 25 shows an X-ray diffraction pattern of the obtained powder. The Rietveld analysis revealed that the powder was a mixture comprising 98 mol % of complex oxide that had a perovskite-type structure and comprised Ba, Zr, Pt, and O. The tolerance factor of the perovskite-type complex oxide was 1.00. Further, ICP spectrometry indicated that this mixed powder comprised the elements at a molar ratio of Ba:Zr:Pt=0.98:1.0:0.0001.

The results confirmed that a product containing the perovskite-type complex oxide was obtained by the above heat treatment, and that Pt was occluded in the product.

Example 18

Dissolution of Platinum in Platinum-Containing Oxide Powder Using Concentrated Hydrochloric Acid 4 ml of concentrated hydrochloric acid was added to 20 mg of light blue platinum-containing oxide powder having a molar ratio of La:Sr:Ba:Sc:Pt=0.7:0.2:0.1:1.0:0.0015, which was obtained by occluding Pt by the same method as in Example 1. Heating was conducted at 60° C. for 6 hours. Consequently, the precipitate comprising the oxide powder disappeared, and a colorless solution was obtained. ICP mass spectrometry revealed that the colorless solution contained Pt.

The results confirmed that the addition of concentrated hydrochloric acid to the oxide in which Pt had been occluded in accordance with the method of Example 1 decomposed the oxide, allowing the dissolution of Pt in the concentrated hydrochloric acid.

Example 19

Dissolution of Platinum in Platinum-Containing Oxide Powder Using Acetic Acid 4 ml of 9N acetic acid was added to 20 mg of light blue platinum-containing oxide powder having a molar ratio of La:Sr:Ba:Sc:Pt=0.7:0.2:0.1:1.0:0.0015, which was obtained by occluding Pt by the same method as in Example 1. Heating was conducted at 60° C. for 48 hours. Consequently, the precipitate comprising the oxide powder disappeared, and a colorless solution was obtained.

The results confirmed that the addition of acetic acid to the oxide in which Pt had been occluded in accordance with the method of Example 1 decomposed the oxide, allowing the dissolution of Pt in the acetic acid.

Example 20

Dissolution of Gold in Gold-Containing Oxide Powder Using Concentrated Hydrochloric Acid 4 ml of concentrated hydrochloric acid was added to 20 mg of light red gold-containing oxide powder having a molar ratio of La:Sr:Ba:Sc:Au=0.7:0.2:0.1:1.0:0.000012, which was obtained by occluding Au by the same method as in Example 2. Heating was conducted at 60° C. for 3 hours. Consequently, the precipitate comprising the oxide powder disappeared, and a colorless solution was obtained.

The results confirmed that the addition of concentrated hydrochloric acid to the oxide in which Au had been occluded in accordance with the method of Example 2 decomposed the oxide, allowing the dissolution of Au in the concentrated hydrochloric acid.

Example 21

Dissolution of Molybdenum in Molybdenum-Containing Oxide Powder Using Concentrated Hydrochloric Acid 4 ml of concentrated hydrochloric acid was added to 20 mg of light green molybdenum-containing oxide powder having a molar ratio of La:Sr:Ba:Sc:Mo=0.7:0.2:0.1:1.0:0.25, which was obtained by occluding Mo by the same method as in Example 3. Heating was conducted at 60° C. for 24 hours. Consequently, the precipitate comprising the oxide powder disappeared, and a colorless solution was obtained.

The results confirmed that the addition of concentrated hydrochloric acid to the oxide in which Mo had been occluded in accordance with the method of Example 3 decomposed the oxide, allowing the dissolution of Mo in the concentrated hydrochloric acid.

Example 22

Dissolution of Platinum in Platinum-Containing Oxide Powder Using Concentrated Hydrochloric Acid 4 ml of concentrated hydrochloric acid was added to 20 mg of light blue platinum-containing oxide powder having a molar ratio of Sr:Zr:Y:Pt=1.0:0.9:0.1:0.00094, which was obtained by occluding Pt by the same method as in Example 4. Heating was conducted at 60° C. for 1 hour. Consequently, the precipitate comprising the oxide powder disappeared, and a colorless solution was obtained.

The results confirmed that the addition of concentrated hydrochloric acid to the oxide in which Pt had been occluded in accordance with the method of Example 4 decomposed the oxide, allowing the dissolution of Pt in the concentrated hydrochloric acid.

Example 23

Dissolution of Palladium in Palladium-Containing Oxide Powder Using Concentrated Hydrochloric Acid 4 ml of concentrated hydrochloric acid was added to 20 mg of light brown palladium-containing oxide powder having a molar ratio of Sr:Zr:Y:Pd=1.0:0.9:0.1:0.00034, which was obtained by occluding Pd by the same method as in Example 5. Heating was conducted at 60° C. for 1 hour. Consequently, the precipitate comprising the oxide powder disappeared, and a colorless solution was obtained.

The results confirmed that the addition of concentrated hydrochloric acid to the oxide in which Pd had been occluded in accordance with the method of Example 5 decomposed the oxide, allowing the dissolution of Pd in the concentrated hydrochloric acid.

Example 24

Dissolution of Rhodium in Rhodium-Containing Oxide Powder Using Concentrated Hydrochloric Acid 4 ml of concentrated hydrochloric acid was added to 20 mg of blue rhodium-containing oxide powder having a molar ratio of Sr:Zr:Y:Rh=1.0:0.9:0.1:0.0034, which was obtained by occluding Rh by the same method as in Example 6. Heating was conducted at 60° C. for 30 minutes. Consequently, the precipitate comprising the oxide powder disappeared, and a colorless solution was obtained.

The results confirmed that the addition of concentrated hydrochloric acid to the oxide in which Rh had been occluded in accordance with the method of Example 6 decomposed the oxide, allowing the dissolution of Rh in the concentrated hydrochloric acid.

Example 25

Dissolution of Rhodium in Rhodium-Containing Oxide Powder Using Aqua Regia 4 ml of aqua regia was added to 20 mg of blue rhodium-containing oxide powder having a molar ratio of Sr:Zr:Y:Rh=1.0:0.9:0.1:0.0034, which was obtained by occluding Rh by the same method as in Example 6. Heating was conducted at 60° C. for 1 hour. Consequently, the precipitate comprising the oxide powder disappeared, and an orange solution was obtained.

The results confirmed that the addition of aqua regia to the oxide in which Rh had been occluded in accordance with the method of Example 6 decomposed the oxide, allowing the dissolution of Rh in the aqua regia.

Example 26

Dissolution of Rhodium in Rhodium-Containing Oxide Powder Using Concentrated Nitric Acid 2 ml of concentrated nitric acid was added to 10 mg of blue rhodium-containing oxide powder having a molar ratio of Sr:Zr:Y:Rh=1.0:0.9:0.1:0.0034, which was obtained by occluding Rh by the same method as in Example 6. Heating was conducted at 60° C. for 1 hour. Consequently, a colorless solution containing the colorless precipitate in which the oxide powder was partially decomposed was obtained. When a small amount of water was added, the precipitate disappeared.

The results confirmed that in the case where concentrated nitric acid was added to the oxide in which Rh had been occluded in accordance with the method of Example 6, Rh was dissolved in nitric acid by lowering the concentration of nitric acid after the oxide was partially decomposed using the concentrated nitric acid.

Example 27

Dissolution of Iridium in Iridium-Containing Oxide Powder Using Concentrated Hydrochloric Acid 4 ml of concentrated hydrochloric acid was added to 20 mg of brown iridium-containing oxide powder having a molar ratio of Sr:Zr:Y:Ir=1.0:0.9:0.1:0.0039, which was obtained by occluding Ir by the same method as in Example 7. Heating was conducted at 60° C. for 1 hour. Consequently, the precipitate comprising the oxide powder disappeared, and a colorless solution was obtained.

The results confirmed that the addition of concentrated hydrochloric acid to the oxide in which Ir had been occluded in accordance with the method of Example 7 decomposed the oxide, allowing the dissolution of Ir in the concentrated hydrochloric acid.

Example 28

Dissolution of Iridium in Iridium-Containing Oxide Powder Using Diluted Hydrochloric Acid 4 ml of 3N diluted hydrochloric acid was added to 20 mg of brown iridium-containing oxide powder having a molar ratio of Sr:Zr:Y:Ir=1.0:0.9:0.1:0.0039, which was obtained by occluding Ir by the same method as in Example 7. Heating was conducted at 60° C. for 1 hour. Consequently, the precipitate comprising the oxide powder disappeared, and a colorless solution was obtained.

The results confirmed that the addition of diluted hydrochloric acid to the oxide in which Ir had been occluded in accordance with the method of Example 7 decomposed the oxide, allowing the dissolution of Ir in the diluted hydrochloric acid.

Example 29

Dissolution of Iridium in Iridium-Containing Oxide Powder Using Diluted Nitric Acid 4 ml of 4N diluted nitric acid was added to 20 mg of brown iridium-containing oxide powder having a molar ratio of Sr:Zr:Y:Ir=1.0:0.9:0.1:0.0039, which was obtained by occluding Ir by the same method as in Example 7. Heating was conducted at 60° C. for 1 hour. Consequently, the precipitate comprising the oxide powder disappeared, and a light red solution was obtained.

The results confirmed that the addition of diluted nitric acid to the oxide in which Ir had been occluded in accordance with the method of Example 7 decomposed the oxide, allowing the dissolution of Ir in the diluted nitric acid.

Example 30

Dissolution of Ruthenium in Ruthenium-Containing Oxide Powder Using Concentrated Hydrochloric Acid 4 ml of concentrated hydrochloric acid was added to 20 mg of orange ruthenium-containing oxide powder having a molar ratio of Sr:Zr:Y:Ru=1.0:0.9:0.1:0.008, which was obtained by occluding Ru by the same method as in Example 8. Heating was conducted at 60° C. for 1 hour. Consequently, the precipitate comprising the oxide powder disappeared, and a brown solution was obtained.

The results confirmed that the addition of concentrated hydrochloric acid to the oxide in which Ru had been occluded in accordance with the method of Example 8 decomposed the oxide, allowing the dissolution of Ru in the concentrated hydrochloric acid.

Example 31

Dissolution of Ruthenium in Ruthenium-Containing Oxide Powder Using Sulfuric Acid 4 ml of 9N sulfuric acid was added to 20 mg of orange ruthenium-containing oxide powder having a molar ratio of Sr:Zr:Y:Ru=1.0:0.9:0.1:0.008, which was obtained by occluding Ru by the same method as in Example 8. Heating was conducted at 60° C. for 24 hours. Consequently, a reddish brown solution containing the colorless precipitate in which the oxide powder was partially decomposed was obtained.

A change in color indicated that the addition of sulfuric acid to the oxide in which Ru had been occluded in accordance with the method of Example 8 decomposed the oxide, allowing the dissolution of Ru in the sulfuric acid.

Example 32

Dissolution of Rhenium in Rhenium-Containing Oxide Powder Using Concentrated Hydrochloric Acid 4 ml of concentrated hydrochloric acid was added to 20 mg of pale yellow rhenium-containing oxide powder having a molar ratio of Sr:Zr:Y:Re=1.0:0.9:0.1:0.0034, which was obtained by occluding Re by the same method as in Example 9. Heating was conducted at 60° C. for 6 hours. Consequently, the precipitate comprising the oxide powder disappeared, and a colorless solution was obtained.

The results confirmed that the addition of concentrated hydrochloric acid to the oxide in which Re had been occluded in accordance with the method of Example 9 decomposed the oxide, allowing the dissolution of Re in the concentrated hydrochloric acid.

Example 33

Dissolution of Tungsten in Tungsten-Containing Oxide Powder Using Concentrated Hydrochloric Acid 4 ml of concentrated hydrochloric acid was added to 20 mg of light yellow tungsten-containing oxide powder having a molar ratio of Sr:Zr:Y:W=1.0:0.84:0.09:0.14, which was obtained by occluding W by the same method as in Example 10. Heating was conducted at 60° C. for 6 hours. Consequently, the precipitate comprising the oxide powder disappeared, and a colorless solution was obtained.

The results confirmed that the addition of concentrated hydrochloric acid to the oxide in which W had been occluded in accordance with the method of Example 10 decomposed the oxide, allowing the dissolution of W in the concentrated hydrochloric acid.

Example 34

Dissolution of Platinum and Rhodium in Platinum-Rhodium-Containing Oxide Powder Using Concentrated Hydrochloric Acid 4 ml of concentrated hydrochloric acid was added to 20 mg of light reddish purple platinum-rhodium-containing oxide powder having a molar ratio of Sr:Zr:Y:Pt:Rh=1.0:0.9:0.1:0.0004:0.0007, which was obtained by occluding Rh by the same method as in Example 11. Heating was conducted at 60° C. for 1 hour. Consequently, the precipitate comprising the oxide powder disappeared, and a colorless solution was obtained.

The results confirmed that the addition of concentrated hydrochloric acid to the oxide in which Rh had been occluded in accordance with the method of Example 11 decomposed the oxide, allowing the dissolution of Rh in the concentrated hydrochloric acid.

Example 35

Dissolution of Ruthenium in Ruthenium-Containing Oxide Powder Using Concentrated Hydrochloric Acid 4 ml of concentrated hydrochloric acid was added to 20 mg of black ruthenium-containing oxide powder having a molar ratio of La:Sr:Sc:Zn:Ru=0.9:0.1:0.95:0.05:0.05, which was obtained by occluding Ru by the same method as in Example 12. Heating was conducted at 60° C. for 2 hours. Consequently, the precipitate comprising the oxide powder disappeared, and a brown solution was obtained.

The results confirmed that the addition of concentrated hydrochloric acid to the oxide in which Ru had been occluded in accordance with the method of Example 12 decomposed the oxide, allowing the dissolution of Ru in the concentrated hydrochloric acid.

Example 36

Dissolution of Platinum in Platinum-Containing Oxide Powder Using Concentrated Hydrochloric Acid 4 ml of concentrated hydrochloric acid was added to 20 mg of light brown platinum-containing oxide powder having a molar ratio of La:Ca:Sc:Al:Pt=0.9:0.1:0.95:0.05:0.0046, which was obtained by occluding Pt by the same method as in Example 13. Heating was conducted at 60° C. for 2 hours. Consequently, the precipitate comprising the oxide powder disappeared, and a colorless solution was obtained.

The results confirmed that the addition of concentrated hydrochloric acid to the oxide in which Pt had been occluded in accordance with the method of Example 13 decomposed the oxide, allowing the dissolution of Pt in the concentrated hydrochloric acid.

Example 37

Dissolution of Platinum in Platinum-Containing Oxide Powder Using Concentrated Hydrochloric Acid 4 ml of concentrated hydrochloric acid was added to 20 mg of light blue platinum-containing oxide powder having a molar ratio of La:Sr:In:Pt=0.9:0.1:1.0:0.0084, which was obtained by occluding Pt by the same method as in Example 14. Heating was conducted at 60° C. for 30 minutes. Consequently, the precipitate comprising the oxide powder disappeared, and a colorless solution was obtained.

The results confirmed that the addition of concentrated hydrochloric acid to the oxide in which Pt had been occluded in accordance with the method of Example 14 decomposed the oxide, allowing the dissolution of Pt in the concentrated hydrochloric acid.

Example 38

Dissolution of Platinum in Platinum-Containing Oxide Powder Using Concentrated Hydrochloric Acid 4 ml of concentrated hydrochloric acid was added to 20 mg of black platinum-containing oxide powder having a molar ratio of Gd:Ca:Fe:Pt=0.9:0.1:1.0:0.003, which was obtained by occluding Pt by the same method as in Example 15. Heating was conducted at 60° C. for 2 hours. Consequently, the precipitate comprising the oxide powder disappeared, and a yellow solution was obtained.

The results confirmed that the addition of concentrated hydrochloric acid to the oxide in which Pt had been occluded in accordance with the method of Example 15 decomposed the oxide, allowing the dissolution of Pt in the concentrated hydrochloric acid.

Example 39

Dissolution of Platinum in Platinum-Containing Oxide Powder Using Concentrated Hydrochloric Acid 4 ml of concentrated hydrochloric acid was added to 20 mg of light blue platinum-containing oxide powder having a molar ratio of Ba:Ti:Al:Pt=1.0:0.9:0.1:0.0001, which was obtained by occluding Pt by the same method as in Example 16. Heating was conducted at 60° C. for 8 hours. Consequently, a colorless solution containing the colorless precipitate in which the oxide powder was partially decomposed was obtained. In addition, ICP mass spectrometry indicated that the colorless solution contained Pt.

The results confirmed that the addition of concentrated hydrochloric acid to the oxide in which Pt had been occluded in accordance with the method of Example 16 partially decomposed the oxide, allowing the dissolution of Pt in the concentrated hydrochloric acid.

Example 40

Dissolution of Platinum in Platinum-Containing Oxide Powder Using Diluted Hydrochloric Acid 4 ml of 6N diluted hydrochloric acid was added to 20 mg of light yellowish brown platinum-containing oxide powder having a molar ratio of Ba:Zr:Pt=0.98:1.0:0.0001, which was obtained by occluding Pt by the same method as in Example 17. Heating was conducted at 60° C. for 8 hours. Consequently, the precipitate comprising the oxide powder disappeared, and a colorless solution was obtained.

The results confirmed that the addition of diluted hydrochloric acid to the oxide in which Pt had been occluded in accordance with the method of Example 17 decomposed the oxide, allowing the dissolution of Pt in the diluted hydrochloric acid.

The invention claimed is:

1. A method for collecting one or more metal components from a metal component-containing material, the method comprising heating the metal component-containing material and a composition comprising a compound containing at least one element selected from the group consisting of lanthanoid elements and elements in group 2 of the periodic table and a compound containing at least one element selected from the group consisting of elements in groups 3, 4, 12, and 13 of the periodic table and transition metal elements in the 4th period of the periodic table in such a manner that a metal vapor or metal oxide vapor produced by heating the metal component-containing material is brought into contact with the composition.

2. The method according to claim 1, wherein the metal component-containing material and the composition are placed together in one container and heated.

3. The method according to claim 1, wherein the metal component-containing material is a noble or rare metal component-containing waste material.

4. A method for recovering metal, comprising:
    collecting one or more metal components by the method of claim 1;
    dissolving the collected one or more metal components in an acid to obtain one or more metal elements dissolved in the acid; and
    then recovering the dissolved one or more metal elements as a solid metal.

5. A method for collecting one or more metal components from a metal component-containing material, the method comprising heating the metal component-containing material and a composition comprising a compound containing at least one element selected from the group consisting of lanthanoid elements and elements in group 2 of the periodic table and a compound containing at least one element selected from the group consisting of elements in groups 3, 4, 12, and 13 of the periodic table and transition metal elements in the 4th period of the periodic table in such a manner that a metal vapor or metal oxide vapor produced by heating the metal component-containing material is brought into contact with the composition,
    wherein the composition used in the method comprises a compound obtained by collecting additional components dispersed in the acid after recovering the dissolved one or more metal elements by the method of claim 4.

* * * * *